United States Patent
Otonari et al.

(10) Patent No.: US 9,765,170 B2
(45) Date of Patent: Sep. 19, 2017

(54) GRAFT COPOLYMER CONTAINING POLYORGANOSILOXANE, RESIN COMPOSITION, MOLDED ARTICLE, SLIDABILITY-IMPROVING AGENT, AND SLIDING MEMBER

(71) Applicant: Mitsubishi Chemical Corporation, Tokyo (JP)

(72) Inventors: Hiroaki Otonari, Otake (JP); Sohei Ueki, Otake (JP); Shinji Matsuoka, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 14/911,940

(22) PCT Filed: Aug. 13, 2013

(86) PCT No.: PCT/JP2013/071890
§ 371 (c)(1),
(2) Date: Feb. 12, 2016

(87) PCT Pub. No.: WO2013/162080
PCT Pub. Date: Oct. 31, 2013

(65) Prior Publication Data
US 2016/0194428 A1 Jul. 7, 2016

(51) Int. Cl.
*C08L 51/00* (2006.01)
*C08F 283/12* (2006.01)
(Continued)

(52) U.S. Cl.
CPC ........ *C08F 283/124* (2013.01); *C08F 285/00* (2013.01); *C08L 69/00* (2013.01);
(Continued)

(58) Field of Classification Search
CPC .................................................. C08F 283/124
See application file for complete search history.

(56) References Cited

FOREIGN PATENT DOCUMENTS

EP      1 475 396 A1    11/2004
EP      1 832 613 A1     9/2007
(Continued)

OTHER PUBLICATIONS

English Machine Translation JP2010275523 (A) Obtained Sep. 15, 2016: https://worldwide.espacenet.com/publicationDetails/biblio?CC=JP&NR=2010275523A&KC=A&FT=D&ND=3&date=20101209&DB=EPODOC&locale=en_EP.*
(Continued)

*Primary Examiner* — Lanee Reuther
(74) *Attorney, Agent, or Firm* — Oblon, McClelland, Maier & Neustadt, L.L.P.

(57) ABSTRACT

The invention provides a thermoplastic resin composition, which does not substantially compromise color rendering and flame retardance of a thermoplastic resin and has high impact resistance, slidability, and chemical resistance in a wide scope of environmental conditions ranging from low temperature to high temperature. A graft copolymer ($G_{F2}$) containing rubber is a graft copolymer containing rubber formed by performing graft polymerization of 1 or more vinyl monomers on a composite rubber containing a polyorganosiloxane (B1) and a polyalkyl (meth)acrylate (B2). The content of a component derived from a silane compound containing a vinyl-based polymerizable group in the polyorganosiloxane (B1) is 1 mass % to 10 mass %. The volume-average particle size of the graft copolymer containing rubber is 300 nm to 2000 nm. The content of the polyorganosiloxane (B1) in the graft copolymer containing rubber is 70 mass % to 98 mass %. An acetone soluble matter is 5.0 mass % or more and 30.0 mass % or less.

4 Claims, 1 Drawing Sheet

(51) Int. Cl.
*C08F 285/00* (2006.01)
*C08L 69/00* (2006.01)

(52) U.S. Cl.
CPC ....... *C08L 2201/02* (2013.01); *C08L 2205/03* (2013.01); *C08L 2207/00* (2013.01); *C08L 2207/04* (2013.01)

(56) References Cited

FOREIGN PATENT DOCUMENTS

| | | |
|---|---|---|
| EP | 2 660 256 A1 | 11/2013 |
| JP | H09309935 | 12/1997 |
| JP | H10176017 | 6/1998 |
| JP | H10-279642 | 10/1998 |
| JP | 2000-017136 A | 1/2000 |
| JP | 2011-179016 A | 1/2000 |
| JP | 2001-055499 A | 2/2001 |
| JP | 3168638 B2 | 3/2001 |
| JP | 2004-359889 A | 12/2004 |
| JP | 2010-007045 A | 1/2010 |
| JP | 2010-275523 A | 12/2010 |
| JP | 2010275523 A * | 12/2010 |
| JP | 2011-012241 A | 1/2011 |
| JP | 2011012241 A * | 1/2011 |
| JP | 2011-026476 A | 2/2011 |
| JP | 2011-046843 A | 3/2011 |
| JP | 2011-063706 A | 3/2011 |
| JP | 2012-007088 A | 1/2012 |
| WO | 2006/011384 A | 2/2006 |
| WO | WO 2012/091024 A1 | 7/2012 |

OTHER PUBLICATIONS

English Machine Translation JP2011012241 (A) Obtained Sep. 15, 2016 at: http://translationportal.epo.org/emtp/translate/?ACTION=description-retrieval&COUNTRY=JP&ENGINE=google&FORMAT=docdb&KIND=A&LOCALE=en_EP&NUMBER=2011012241&OPS=ops.epo.org/3.1&SRCLANG=ja&Trglang=en.*
International Search Report issued on Nov. 19, 2013 for PCT/JP2013/071890 filed on Aug. 13, 2013.
Partial Supplementary European Search Report issued on Jul. 25, 2016 in Patent Application No. 13780989.3
Japanese Office Action dated Jul. 18, 2017 (dispatched on Jul. 25, 2017) in Patent Application No. 2016-135035 with English translation.

* cited by examiner

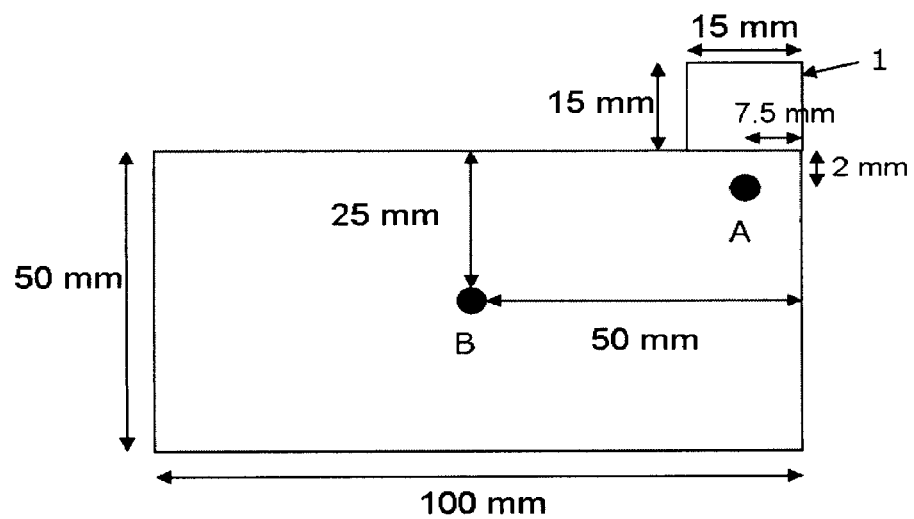

GRAFT COPOLYMER CONTAINING POLYORGANOSILOXANE, RESIN COMPOSITION, MOLDED ARTICLE, SLIDABILITY-IMPROVING AGENT, AND SLIDING MEMBER

FIELD OF THE INVENTION

The invention relates to a graft copolymer containing polyorganosiloxane capable of increasing the impact resistance of a thermoplastic resin, and shows high flame retardance, slidability, and color rendering (pigment colorability) in a molded article obtained from the thermoplastic resin. Moreover, the invention relates to a thermoplastic resin composition containing the graft copolymer and having high flame retardance, slidability, and color rendering (pigment colorability) and a molded article thereof.

Moreover, the invention relates to a slidability-improving agent containing a graft copolymer containing polyorganosiloxane having excellent slidability, color rendering (pigment colorability), and impact resistance, a thermoplastic resin composition containing the slidability-improving agent, and a sliding member formed by molding the thermoplastic resin composition.

DESCRIPTION OF RELATED ART

The thermoplastic resin composition having excellent flame retardance and mechanical characteristics has great demand in markets such as the electrical/electronics sector, and high performance is needed. In particular, the polycarbonate resin is used as a general engineering plastic and has excellent transparency, impact resistance, heat resistance, and dimensional stability . . . etc., and due to such excellent characteristics thereof, the polycarbonate resin is extensively industrially applied as, for instance, a material in the automotive sector, the office automation (OA) machine sector such as a printer, or the electrical/electronics sector such as a mobile phone. In particular, a high degree of flame retardance or impact resistance is required in parts such as external PC parts. Among these parts, to meet such safety demands, a high flame retardance equivalent to UL94V-0 or V-1 is required.

Moreover, recently, these parts have gradually become thin for the objects of, for instance, miniaturization, lightweight, and high functionality. Therefore, in a thinner and lighter molded article, a resin material having good mechanical properties such as sufficient impact resistance and excellent flame retardance and heat resistance is also needed.

Therefore, to increase the flame retardance of the thermoplastic resin, in particular the polycarbonate-based resin, a method of preparing a halogen-based flame retardant or a phosphorus-based flame retardant has been proposed. However, a thermoplastic resin composition prepared to have a halogen-based flame retardant containing chlorine or bromine has the issue of corrosive gas generation during burning, and a flame retardant without these halogens is desired.

Moreover, products using thermoplastic resin composition containing excessive phosphorous-based flame retardant has the possibility of environmental pollution caused by the phosphorous-based flame retardant seeping from the product when the product is discarded. Therefore, a thermoplastic resin composition for which the usage amount of a phosphorous-based flame retardant is minimized or a phosphorous-based flame retardant is not used and high flame retardance is provided is strongly desired.

Moreover, undesirable conditions such as damage sometimes occur to the molded product obtained from these materials due to attached chemical products such as hand cream and detergent. To avoid the undesirable conditions, a thermoplastic resin composition having excellent chemical resistance is also strongly desired.

To increase flame retardance and impact resistance . . . etc., various materials have been proposed. For instance, patent literature 1 provides a flame retardant thermoplastic resin composition including a graft copolymer containing 65 wt % to 99 wt % of polyorganosiloxane, a polycarbonate resin, and a phosphate compound. Patent literature 2 provides a graft copolymer obtained by performing polymerization on 10 mass % to 60 mass % of a vinyl monomer containing a (meth)acrylate monomer having an aryl group or a benzyl group in the presence of 40 mass % to 90 mass % of a polyorganosiloxane-based rubber. Moreover, patent literature 3 provides a thermoplastic resin composition containing a composite rubber-based graft copolymer and a resin component, wherein the above composite rubber-based graft copolymer is a composite rubber-based graft copolymer containing polyorganosiloxane and polyalkyl acrylate, and the content of the polyorganosiloxane is 30 mass % to 70 mass %, the volume-average particle size is 300 nm to 2000 nm, and the particle size distribution Dw/Dn (mass-average particle size/number-average particle size) is 1.0 to 2.0.

Moreover, a molded article applied in, for instance, the automotive sector, the electrical/electronics equipment sector, and OA machines such as printers requires, for instance, slidability, color rendering (pigment colorability), and high impact resistance are required. In recent years, with the popularity of hybrid cars or electric cars, examples in which slidability is demanded to prevent creaking in embedded parts inside automobiles have increased.

To increase the slidability of the thermoplastic resin, a method in which low molecular weight polytetrafluoroethylene or silicone oil is added in a thermoplastic resin has been proposed; however, the reduction in the impact resistance of the thermoplastic resin is an issue. Therefore, the addition of a graft copolymer containing polyorganosiloxane formed by performing graft polymerization on a rubber component containing polyorganosiloxane and a vinyl-based monomer in a thermoplastic resin has been proposed to prevent reduction in strength and provide slidability at the same time.

For instance, patent literature 4 provides a silicone/acrylic composite rubber-based graft copolymer having a number-average particle size of 300 nm to 2000 nm and a polyorganosiloxane content of 20 mass % to 70 mass %, and a thermoplastic resin composition containing the composite rubber-based graft copolymer. Patent literature 5 recites a thermoplastic resin composition containing a graft copolymer containing polyorganosiloxane having a polyorganosiloxane content of 60 mass % to 90 mass % and excellent slidability. Patent literature 6 provides a composite rubber-based graft copolymer having high polyorganosiloxane content.

PRIOR ART LITERATURE

Patent Literature

[Patent literature 1] Japanese Patent Laid-Open Publication No. 2000-17136

[Patent literature 2] Japanese Patent Laid-Open Publication No. 2011-63706

[Patent literature 3] Japanese Patent Laid-Open Publication No. 2011-179016

[Patent literature 4] Japanese Patent Laid-Open Publication No. 2004-359889

[Patent literature 5] WO06/11384

[Patent document 6] Japanese Patent Laid-Open Publication No. 2011-26476

However, the molded article obtained in patent literature 1 has unsatisfactory flame retardance, impact resistance, and color rendering. The molded article obtained in patent literature 2 has unsatisfactory flame retardance, impact resistance, and slidability. Moreover, the molded article obtained in patent literature 3 has unsatisfactory flame retardance and slidability.

In patent literature 4, although improvement in impact resistance and pigment colorability is mentioned, slidability is not. The color rendering of the rubber-based graft copolymers of patent literature 5 and patent literature 6 is insufficient due to small volume-average particle size.

SUMMARY OF THE INVENTION

Technical Problem

An object of the invention is to provide a thermoplastic resin composition that does not significantly compromise color rendering and flame retardance of a thermoplastic resin and having high impact resistance. Moreover, an object of the invention is to provide a graft copolymer capable of providing such characteristics to the thermoplastic resin (referred to as "1st topic" in the following).

Moreover, an object of the invention is to provide a thermoplastic resin composition having excellent balance among slidability, color rendering, and impact resistance, and a slidability-improving agent capable of providing such characteristics to a thermoplastic resin (referred to as "2nd topic" in the following).

Solution to Problem

The above "1st topic" is solved by the following 1st invention group [1] to [25].

[1] A graft copolymer ($G_{F1}$) containing rubber is a graft copolymer containing rubber formed by performing graft polymerization on a rubber containing a polyorganosiloxane (B1) and 1 or more vinyl monomers, wherein the content of a component derived from a silane compound containing a vinyl-based polymerizable group in the above polyorganosiloxane (B1) is 1 mass % to 10 mass %, the volume-average particle size of the above graft copolymer containing rubber is 300 nm to 2000 nm, the content of the above polyorganosiloxane (B1) in the above graft copolymer containing rubber is 70 mass % to 98 mass %, and the grafting rate obtained from the following formula (1) is 10 mass % or less.

$$\text{Grafting rate [\%]} = \frac{(wa - wo \times R/100)}{(wo \times R/100)} \times 100 \quad (1)$$

wa: mass (g) of acetone insoluble matter of sample,
wo: total amount (g) of sample, R: fraction (mass %) of rubber containing the polyorganosiloxane (B1) in the added raw material in the production of the graft copolymer.

[2] A graft copolymer ($G_{F2}$) containing rubber is a graft copolymer containing rubber formed by performing graft polymerization on a composite rubber containing a polyorganosiloxane (B1) and a polyalkyl (meth)acrylate (B2) and 1 or more vinyl monomers, wherein the content of a component derived from a silane compound containing a vinyl-based polymerizable group in the above polyorganosiloxane (B1) is 1 mass % to 10 mass %, the volume-average particle size of the above graft copolymer containing rubber is 300 nm to 2000 nm, the content of the above polyorganosiloxane (B1) in the above graft copolymer containing rubber is 70 mass % to 98 mass %, and an acetone soluble matter is 5.0 mass % or more to 30.0 mass % or less.

[3] A graft copolymer ($G_{F3}$) containing rubber is a graft copolymer containing rubber formed by performing graft polymerization on a rubber containing a polyorganosiloxane (B1) and 1 or more vinyl monomers, the content of a component derived from a silane compound containing a vinyl-based polymerizable group in the above polyorganosiloxane (B1) is 1 mass % to 10 mass %, the volume-average particle size of the above graft copolymer containing rubber is 300 nm to 2000 nm, the content of the above polyorganosiloxane (B1) in the above graft copolymer containing rubber is 70 mass % to 98 mass %, and the content of a component derived from a polyfunctional vinyl monomer is greater than 0 mass % and less than 5 mass %.

[4] The graft copolymer containing rubber in any one of [1] to [3], wherein the above volume-average particle size is 400 nm to 1000 nm.

[5] The graft copolymer containing rubber of [2], wherein the ratio "B1/B2" of the above polyorganosiloxane (B1) and the above polyalkyl (meth)acrylate (B2) is "74/26 to 99/1" mass %.

[6] A thermoplastic resin composition containing 0.1 parts by mass to 12 parts by mass of the graft copolymer containing rubber in any one of [1] to [5], 0.01 parts by mass to 5 parts by mass of the fluorine-based resin (C), and 0.01 parts by mass to 10 parts by mass of the flame retardant (D) based on 100 parts by mass of the thermoplastic resin (A).

[7] The thermoplastic resin composition of [6], wherein the above thermoplastic resin (A) is a thermoplastic resin having at least one bond selected from a carbonate bond, an ester bond, and an amide bond.

[8] The thermoplastic resin composition of [6], wherein the above thermoplastic resin (A) is a polycarbonate-based resin.

[9] The thermoplastic resin composition in any one of [6] to [8], wherein the above flame retardant (D) contains at least one flame retardant selected from a phosphorus-based flame retardant and an organic metal salt-based flame retardant.

[10] A molded article obtained by molding the above thermoplastic resin composition in any one of [6] to [9].

[11] The graft copolymer containing rubber in any one of [1] to [5], wherein the content of the rubber containing the polyorganosiloxane (B1) is 85 mass % to 99 mass % based on 100 mass % of the above graft copolymer.

[12] The graft copolymer containing rubber of [11], wherein based on 100 mass % of a monomer raw material for the above polyorganosiloxane (B1), the usage amount of a siloxane-based crosslinking agent is 0 mass % to 30 mass %, and based on 100 mass % of the monomer raw material for the above graft copolymer, the usage amount of the above silane compound containing a vinyl-based polymerizable group is 0.7 mass % to 9.8 mass %, and the usage amount of the polyfunctional vinyl monomer is greater than 0 mass % and less than 5 mass %.

[13] The graft copolymer containing rubber of [11], wherein based on 100 mass % of a monomer raw material for the above polyorganosiloxane (B1), the usage amount of a siloxane-based crosslinking agent is 0.1 mass % to 10 mass %, and based on 100 mass % of a monomer raw material for the above graft copolymer, the usage amount of the silane compound containing a vinyl-based polymerizable group is 0.7 mass % to 9.8 mass %, and the usage amount of a polyfunctional vinyl monomer is 0.1 mass % or more and 3 mass % or less.

[14] The graft copolymer containing rubber in any one of [1] to [5], wherein the content of the rubber containing the polyorganosiloxane (B1) is 71 mass % or more and less than 85 mass % based on 100 mass % of the above graft copolymer.

[15] The graft copolymer containing rubber of [14], wherein the above grafting vinyl monomer contains a polyfunctional vinyl monomer, and based on 100 mass % of a monomer raw material for the above graft copolymer, the usage amount of the polyfunctional vinyl monomer is greater than 0 mass % and 4 mass % or less.

[16] The graft copolymer containing rubber of [14], wherein the above grafting vinyl monomer contains a polyfunctional vinyl monomer, and based on 100 mass % of a monomer raw material for the above graft copolymer ($G_F$), the usage amount of the above polyfunctional vinyl monomer is 0.1 mass % to 1 mass %.

[17] The graft copolymer containing rubber of [14], wherein the above grafting vinyl monomer does not contain a polyfunctional vinyl monomer, the above rubber containing the polyorganosiloxane (B1) is a composite rubber containing the polyorganosiloxane (B1) and the polyalkyl (meth)acrylate (B2), and based on 100 mass % of a monomer raw material for the above graft copolymer, the total usage amount of a polyfunctional vinyl monomer in an (meth)acrylate component for the composite rubber and a grafting vinyl monomer is greater than 0 mass % and less than 4 mass %.

[18] The graft copolymer containing rubber of [14], wherein the above grafting vinyl monomer does not contain a polyfunctional vinyl monomer, the rubber containing the polyorganosiloxane (B1) is a composite rubber containing the polyorganosiloxane (B1) and the polyalkyl (meth)acrylate (B2), and based on 100 mass % of a monomer raw material for the above graft copolymer, the total usage amount of a polyfunctional vinyl monomer in an (meth)acrylate component for the composite rubber and a grafting vinyl monomer is 0.1 mass % to 1 mass %.

[19] The graft copolymer containing rubber of [14], wherein the above grafting vinyl monomer does not contain a polyfunctional vinyl monomer, the rubber containing the polyorganosiloxane (B1) does not contain the polyalkyl (meth)acrylate (B2), and based on 100 mass % of a monomer raw material for the above polyorganosiloxane (B1), the usage amount of a siloxane-based crosslinking agent is 0 mass % to 1.8 mass %, and based on 100 mass % of a monomer raw material for the above graft copolymer, the usage amount of the silane compound containing a vinyl-based polymerizable group is 0.7 mass % to 5 mass %.

[20] The graft copolymer containing rubber of [14], wherein the above grafting vinyl monomer does not contain a polyfunctional vinyl monomer, the rubber containing the polyorganosiloxane (B1) does not contain the polyalkyl (meth)acrylate (B2), and based on 100 mass % of a monomer raw material for the above polyorganosiloxane (B1), the usage amount of a siloxane-based crosslinking agent is 0.1 mass % to 1.6 mass %, and based on 100 mass % of a monomer raw material for the above graft copolymer, the usage amount of the silane compound containing a vinyl-based polymerizable group is 0.7 mass % to 1.5 mass %.

[21] A thermoplastic resin composition containing 0.1 parts by mass to 12 parts by mass of the graft copolymer containing rubber in any one of [11] to [20], 0.01 parts by mass to 5 parts by mass of the fluorine-based resin (C), and 0.01 parts by mass to 10 parts by mass of the flame retardant (D) based on 100 parts by mass of the thermoplastic resin (A).

[22] The thermoplastic resin composition of [21], wherein the above thermoplastic resin (A) is a thermoplastic resin having at least one bond selected from a carbonate bond, an ester bond, and an amide bond.

[23] The thermoplastic resin composition of [21], wherein the above thermoplastic resin (A) is a polycarbonate-based resin.

[24] The thermoplastic resin composition in any one of [21] to [23], wherein the above flame retardant (D) contains at least one flame retardant selected from a phosphorus-based flame retardant and an organic metal salt-based flame retardant.

[25] A formed article obtained by molding the above thermoplastic resin composition in any one of [21] to [24].

The "2nd topic" is solved by the following 2nd invention group [26] to [36].

[26] A slidability-improving agent, comprising a powder of a graft copolymer ($G_S$) containing rubber formed by performing graft polymerization on a rubber containing polyorganosiloxane and 1 or more vinyl monomers, wherein the content of the polyorganosiloxane in the above graft copolymer ($G_S$) containing rubber is 40 mass % to 95 mass %, and the mass-average particle size Dw of the latex of the above graft copolymer ($G_S$) containing rubber is 300 nm to 2000 nm.

[27] The slidability-improving agent of [26], wherein the particle size distribution (mass-average particle size Dw/number-average average particle size Dn) of the latex of the above graft copolymer ($G_S$) containing rubber is 1.0 to 2.0.

[28] The slidability-improving agent of [26] or [27], wherein the content of the polyorganosiloxane in the above graft copolymer ($G_S$) containing rubber is 41 mass % to 74 mass %.

[29] The slidability-improving agent in any one of [26] to [28], wherein the mass-average particle size Dw of the latex of the above graft copolymer ($G_S$) containing rubber is 400 nm to 1000 nm

[30] The slidability-improving agent in any one of [26] to [29], wherein the above rubber containing polyorganosiloxane is a composite rubber containing polyorganosiloxane and polyalkyl acrylate.

[31] A thermoplastic resin composition for a sliding member, comprising the slidability-improving agent in any one of [26] to [30] and a thermoplastic resin.

[32] The thermoplastic resin composition for a sliding member of [31], wherein the content of the above slidability-improving agent is 4 mass % to 16 mass %, and the content of the above thermoplastic resin is 96 mass % to 84 mass %.

[33] The thermoplastic resin composition for a sliding member of [31], wherein the content of the above slidability-improving agent is 5.1 mass % to 16 mass %, and the content of the above thermoplastic resin is 94.9 mass % to 84 mass %.

[34] The thermoplastic resin composition for a sliding member of [31], wherein the content of the above slidability-improving agent is 7 mass % to 15 mass %, and the content of the above thermoplastic resin is 93 mass % to 85 mass %.

[35] The thermoplastic resin composition for a sliding member in any one of [31] to [34], wherein the above thermoplastic resin is a polycarbonate resin.

[36] A sliding member formed by molding the thermoplastic resin composition for a sliding member in any one of [31] to [35].

Effects of the Invention

By adding the graft copolymer of the 1st invention group in a thermoplastic resin, a resin composition that does not significantly compromise color rendering and flame retardance of the thermoplastic resin and having high impact resistance can be obtained.

By adding the slidability-improving agent of the 2nd invention group in a thermoplastic resin, a resin composition having slidability and excellent balance between color rendering and impact resistance can be provided.

BRIEF DESCRIPTION OF DRAWINGS

FIG. 1 is a diagram illustrating a measuring point A (near the gate) and a measuring point B (center) of an arithmetic mean roughness (Ra) of an injection molded test piece. Numeral 1 represents the gate.

DESCRIPTION OF THE EMBODIMENTS

In the invention, "(meth)acrylate" represents at least one of "acrylate" and "methacrylate". Moreover, "(co)polymer" represents at least one of "polymer" and "copolymer".

In the following, the invention is described in detail. However, unless otherwise specified, all recitations relating to, for instance, material and production conditions are applicable to both the 1st invention group and the 2nd invention group.

<Graft Copolymer Containing Rubber>

The graft copolymer containing rubber of the invention (sometimes referred to as "graft copolymer" hereinafter) is a copolymer formed by performing graft polymerization on a rubber containing a polyorganosiloxane (B1) and 1 or more vinyl monomers.

[Rubber Containing Polyorganosiloxane]

The rubber containing polyorganosiloxane is preferably a polyorganosiloxane rubber or a composite rubber containing polyorganosiloxane and polyalkyl (meth)acrylate.

[Polyorganosiloxane]

The polyorganosiloxane is a polymer containing an organosiloxane unit as a constituent unit. The polyorganosiloxane rubber can be obtained by performing polymerization on an organosiloxane mixture containing "organosiloxane" and "silane compound containing a vinyl-based polymerizable group" or an optional component. The optional component can include, for instance, a siloxane-based crosslinking agent and a siloxane oligomer having a terminal capping group.

The organosiloxane can adopt any of chain organosiloxane and cyclic organosiloxane. The polymerization stability of the cyclic organosiloxane is high and the rate of polymerization thereof is fast, which is preferred. The cyclic organosiloxane is preferably a cyclic organosiloxane having 3-membered rings to 7-membered rings, such as the following. Hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane . . . etc. These can be used alone or in a combination of 2 or more. Among these, in terms of readily controlling the particle size distribution of the rubber containing polyorganosiloxane, preferably 60 mass % or more is octamethylcyclotetrasiloxane.

[Silane Compound Containing Vinyl-Based Polymerizable Group]

The silane compound containing a vinyl-based polymerizable group is used as a siloxane-based graft-linking agent. The silane compound containing a vinyl-based polymerizable group has a siloxane group and has a functional group capable of copolymerizing with a vinyl monomer. Via the use of a silane compound containing a vinyl-based polymerizable group, polyorganosiloxane having a functional group capable of copolymerizing with a vinyl monomer can be obtained. Via the use of such graft-linking agent, grafting can be performed on polyorganosiloxane and the later-described alkyl (meth)acrylate component for the composite rubber, or a vinyl monomer via free-radical polymerization.

The silane compound containing a vinyl-based polymerizable group can include siloxane represented by formula (1).

[formula 1]

$$RSiR^1{}_n(OR^2)_{3-n} \qquad (1)$$

In formula (1), $R^1$ represents a methyl group, an ethyl group, a propyl group, or a phenyl group. $R^2$ represents an organic group in the alkoxy group, and can include, for instance, a methyl group, an ethyl group, a propyl group, or a phenyl group. n represents 0, 1, or 2. R represents any group represented by formula (2) to formula (5).

[formula 2]

$$CH_2=C(R^3)-COO-(CH_2)_p- \qquad (2)$$

$$CH_2=C(R^4)-C_6H_4- \qquad (3)$$

$$CH_2=CH- \qquad (4)$$

$$HS-(CH_2)_p- \qquad (5)$$

In the formulas, $R^3$ and $R^4$ respectively represent hydrogen or a methyl group, and p represents an integer of 1 to 6.

The functional group represented by formula (2) can include, for instance, a methacryloyloxy alkyl group. The siloxane having the group can include, for instance, the following. β-methylacryloxyethyl dimethoxy methyl silane, γ-methylacryloxypropyl methoxy dimethyl silane, γ-methyl acryloxypropyl dimethoxy methyl silane, γ-methylacryloxypropyl trimethoxy silane, γ-methylacryloxypropyl ethoxy diethyl silane, γ-methylacryloxypropyl diethoxy methyl silane, δ-methylacryloxybutyl diethoxy methyl silane . . . etc.

The functional group represented by formula (3) can include, for instance, a vinyl phenyl group. The siloxane having the group can include, for instance, vinyl phenyl ethyl dimethoxy silane.

The siloxane having the functional group represented by formula (4) can include, for instance, vinyl trimethoxy silane or vinyl triethoxy silane.

The functional group represented by formula (5) can include, for instance, a mercaptoalkyl group. The siloxane having the group can include, for instance, the following. γ-mercaptopropyl dimethoxymethyl silane, γ-mercaptopropyl methoxy dimethyl silane, γ-mercaptopropyl diethoxymethyl silane, γ-mercaptopropyl ethoxy dimethyl silane, γ-mercaptopropyl trimethoxy silane . . . etc.

Among these, from the economic perspective, a silane compound containing a vinyl-based polymerizable group having the functional groups represented by formula (2), formula (4), and formula (5) is preferably used, wherein a silane compound containing a vinyl-based polymerizable group having the functional group represented by formula (2) is more preferred.

The silane compounds containing a vinyl-based polymerizable group can be used alone, and can also be used in a combination of 2 or more. Based on 100 mass % of the organosiloxane mixture, the content of the silane compound containing a vinyl-based polymerizable group is 1 mass % to 10 mass %, preferably 1 mass % to 5 mass %. If the amount of the silane compound containing a vinyl-based polymerizable group is less than 1 mass %, then the appearance of the obtained molded article is degraded, and the impact resistance and the flame retardance are low-grade. Even if the amount of the silane compound containing a vinyl-based polymerizable group is greater than 10 mass %, the impact resistance and the flame retardance of the obtained molded article are also low-grade.

The siloxane-based crosslinking agent preferably has a siloxane group. Via the use of a siloxane-based crosslinking agent, polyorganosiloxane having a crosslinked structure can be obtained. The siloxane-based crosslinking agent can include, for instance: a trifunctional or tetrafunctional cross-linking agent such as trimethoxymethyl silane, triethoxyphenyl silane, tetramethoxysilane, tetraethoxysilane, tetra-n-propoxysilane, or tetrabutoxysilane. In particular, a tetrafunctional cross-linking agent is preferred, and tetraethoxysilane is more preferred. Based on 100 mass % of the organosiloxane mixture, the content of the siloxane-based crosslinking agent is preferably 0 mass % to 30 mass %, more preferably 0.1 mass % to 30 mass %, still more preferably 0.1 mass % to 10 mass %, still yet more preferably 0.1 mass % to 1.8 mass %, and most preferably 0.1 mass % to 1.6 mass %.

The so-called siloxane oligomer having a terminal capping group refers to a siloxane oligomer having, for instance, an alkyl group at the terminal of an organosiloxane oligomer to stop the polymerization of the polyorganosiloxane. The siloxane oligomer having a terminal capping group can include, for instance: hexamethyldisiloxane, 1,3-bis(3-glycidoxypropyl)tetramethyldisiloxane, 1,3-bis(3-aminopropyl)tetramethyldisiloxane, or methoxy trimethyl silane.

[Production Method of Polyorganosiloxane Rubber]

The production method of the polyorganosiloxane rubber is not particularly limited, and can include, for instance, the following production method.

First, after an organosiloxane mixture containing organosiloxane and a silane compound containing a vinyl-based polymerizable group or an optional component is emulsified via an emulsifier and water to prepare an emulsion, polymerization is performed using an acid catalyst at high temperature. Then, the acid is neutralized via an alkaline substance to obtain a latex of the polyorganosiloxane rubber.

In the production method, the preparation method of the emulsion can include, for instance: a method in which a homomixer is used to perform microparticulation via a shear force generated by high-speed rotation, or a method in which, for instance, a homogenizer is used to perform microparticulation via the ejection force generated by a high-pressure generation machine so as to perform mixing via high-speed stirring. Among these, the method in which a homogenizer is used is the preferred method due to the narrowing of the distribution of particle size of the latex of the polyorganosiloxane rubber.

The mixing method of the acid catalyst for polymerization can include, for instance: (1) a method in which an organosiloxane mixture, an emulsifier, water, and an acid catalyst are added all at once, and then mixing is performed; (2) a method in which an aqueous acid catalyst solution is continuously added or added all at once in the emulsion of an organosiloxane mixture; or (3) a method in which the emulsion of an organosiloxane mixture is added dropwise at a fixed speed in an aqueous acid catalyst solution at high temperature, and then mixing is performed. In terms of ready control of the particle size of the polyorganosiloxane, a method in which the emulsion of the organosiloxane mixture is kept at 70° C. to 85° C. and then an aqueous acid catalyst solution is added continuously or all at once is preferred.

In the case of the 1st invention group, the polymerization temperature is preferably 50° C. or more, more preferably 70° C. or more. Moreover, when the aqueous acid catalyst solution is added to the above emulsion all at once to perform polymerization, the polymerization time is generally 2 hours or more, preferably 5 hours or more.

In the case of the 2nd invention group, the polymerization temperature is preferably 50° C. to 95° C., more preferably 70° C. to 95° C. Moreover, when the acid catalyst is mixed with the organosiloxane mixture, the emulsifier, and water, when polymerization is performed after microparticulation is performed, the polymerization time is preferably 2 hours to 15 hours, more preferably 5 hours to 10 hours.

Then, since cross-linking reaction between silanol is performed at a temperature of 30° C. or less, to increase crosslink density of the polyorganosiloxane, the cross-linking reaction can also be kept at a temperature of 30° C. or less for about 5 hours to about 100 hours after polymerization is performed at a high temperature of 50° C. or more.

The polymerization reaction of the organosiloxane mixture can be ended after the pH of the latex is neutralized to 6 to 8 using an alkaline substance such as sodium hydroxide, potassium hydroxide, or aqueous ammonia solution.

The emulsifier used in the above production method is not particularly limited provided the emulsifier can emulsify the organosiloxane mixture, and an anionic emulsifier or a nonionic emulsifier is preferred. The anionic emulsifier can include, for instance, the following. Sodium alkylbenzene sulfonate, sodium alkyl diphenyl ether disulfonate, sodium alkyl sulfate, sodium polyoxyethylene alkyl sulfate, or sodium polyoxyethylene nonylphenyl ether sulfate . . . etc.

The nonionic emulsifier can include, for instance, the following. Polyoxyethylene alkyl ether, polyoxyethylene alkylene alkylether, polyoxyethylene distyrenated phenyl ether, polyoxyethylene tribenzylphenyl ether, polyoxyethylene polyoxypropylene glycol . . . etc.

The emulsifiers can be used alone, and can also be used in a combination of 2 or more.

Based on 100 parts by mass of the organosiloxane mixture, the usage amount of the emulsifier is preferably 0.05 parts by mass to 10 parts by mass, more preferably 0.1 parts by mass to 5 parts by mass. The desired particle size can be obtained via the usage amount of the emulsifier. By setting the usage amount of the emulsifier to 0.05 parts by mass or more, the emulsion stability of the emulsion of the organosiloxane mixture is sufficient, and by setting the usage amount of the emulsifier to 10 parts by mass or less, reduction in coloring of the graft copolymer or thermal decomposition resistance of the resin composition caused by the emulsifier can be inhibited.

The acid catalyst used in the polymerization of the organosiloxane mixture can include, for instance: sulfonic acid such as aliphatic sulfonic acid, aliphatic-substituted benzenesulfonic acid, or aliphatic-substituted naphthalene sulfonic acid, or an inorganic acid such as sulfuric acid, hydrochloric acid, or nitric acid. The acid catalysts can be used alone, and can also be used in a combination of 2 or more. Among these, if an inorganic acid such as sulfuric acid, hydrochloric acid, or nitric acid is used, the particle size distribution of the latex of the polyorganosiloxane rubber can be made narrow. As a result, poor appearance of the molded article caused by the emulsifier component in the latex of the polyorganosiloxane rubber can be reduced. From the perspective of achieving the desired particle size, for instance, based on 100 parts by mass of the organosiloxane mixture, the usage amount of the acid catalyst preferably includes 0.1 parts by mass to 0.5 parts by mass of 95% sulfuric acid.

The mass-average particle size Dw of the latex of the polyorganosiloxane rubber is preferably 250 nm to 1000 nm. By setting the mass-average particle size of the latex of the polyorganosiloxane rubber to 250 nm to 1000 nm, the volume-average particle size of the graft copolymer or the mass-average particle size of the latex of the graft copolymer can be adjusted to 300 nm to 2000 nm.

The particle size distribution (mass-average particle size Dw/number-average particle size Dn) of the latex of the rubber containing polyorganosiloxane is preferably 1.0 to 1.7. By setting Dw/Dn to 1.0 to 1.7, a graft copolymer having high color rendering can be obtained.

Moreover, the measuring methods of the mass-average particle size Dw and the number-average particle size Dn of the latex of the rubber containing polyorganosiloxane, the mass-average particle size Dw and the number-average particle size Dn of the latex of the graft copolymer, and the volume-average particle size of the graft copolymer are described later.

To increase mechanical stability, an emulsifier can also be added in the latex of the rubber containing polyorganosiloxane obtained via the above method as needed. The emulsifier is preferably the same anionic emulsifier or nonionic emulsifier exemplified in the above emulsifiers.

[Composite Rubber]

In the invention, the rubber containing polyorganosiloxane can adopt a composite rubber containing the polyorganosiloxane (B1) and the polyalkyl (meth)acrylate (B2) (sometimes referred to as "composite rubber" hereinafter). The composite rubber is a rubber containing the above polyorganosiloxane and the polyalkyl (meth)acrylate represented by the following FOX equation and having a glass transition temperature (Tg) of 0° C. or less.

$$1/(273+Tg)=\Sigma(wi/(273+Tgi)).$$

In the above equation, Tg is the glass transition temperature (° C.) of the copolymer, wi is the mass fraction of a monomer i, and Tgi is the glass transition temperature (° C.) of the homopolymer obtained by performing polymerization on the monomer i. The value of Tg of the homopolymer is a value recited in the POLYMER HANDBOOK, vol. 1 (WILEY-INTERSCIENCE).

The composite rubber is preferably a rubber obtained by performing polymerization on alkyl (meth)acrylate in the presence of the polyorganosiloxane rubber.

The polyalkyl (meth)acrylate (B2) forming the composite rubber can be obtained by performing polymerization on an alkyl (meth)acrylate component (sometimes referred to as "(meth)acrylate component for composite rubber" hereinafter). The (meth)acrylate component for the composite rubber preferably contains "alkyl (meth)acrylate for which the Tg of the homopolymer is 0° C. or less" and "crosslinking monomer".

The alkyl (meth)acrylate for which the Tg of the homopolymer is 0° C. or less can include, for instance: ethyl acrylate, n-propyl acrylate, n-butyl acrylate, iso-butyl acrylate, or 2-ethylhexyl acrylate. These can be used alone or in a combination of 2 or more. Among these, if the impact resistance of the thermoplastic resin composition and the luster of the molded article are considered, then n-butyl acrylate is preferred.

The "crosslinking monomer" can include, for instance, the following "polyfunctional vinyl monomers". Allyl (meth)acrylate, triallyl cyanurate, triallyl isocyanurate, divinyl benzene, diallyl phthalate, ethylene di(meth)acrylate, propylene glycol di(meth)acrylate, 1,3-butanediol di(meth)acrylate, 1,4-butanediol di(meth)acrylate, 1,6-hexanediol di(meth)acrylate, triallyl trimellitate . . . etc. These can be used alone or in a combination of 2 or more.

[Production Method of Composite Rubber]

The production method of the composite rubber is not particularly limited, and can include, for instance, an emulsion polymerization method, a suspension polymerization method, or a microsuspension polymerization method, but an emulsion polymerization method is preferably used. In particular, the following method is more preferred: adding a (meth)acrylate component for composite rubber in the latex of the polyorganosiloxane rubber, such that after the (meth)acrylate component for composite rubber is immersed in rubber particles, the (meth)acrylate component for composite rubber is reacted in an emulsion polymerization to obtain the latex of the composite rubber.

The method of preparing the mixture of the latex of the polyorganosiloxane rubber and the (meth)acrylate component for composite rubber can include, for instance, a method in which the above alkyl (meth)acrylate and a polyfunctional vinyl monomer are added in the latex of the polyorganosiloxane rubber. The (meth)acrylate component for composite rubber is thus immersed in the particles of the polyorganosiloxane rubber, and then the temperature is increased to volatilize a known free-radical polymerization initiator so as to perform polymerization. In the production method, the method in which a (meth)acrylate component for composite rubber is added in the latex of the polyorganosiloxane rubber can include, for instance, a method in which the (meth)acrylate component for composite rubber is added all at once, or a method in which all of the (meth)acrylate component for composite rubber is added dropwise at a fixed speed.

During the production of the latex of the composite rubber, to stabilize the latex and to control the mass-average particle size of the latex of the composite rubber, an emulsifier can be added. The emulsifier is not particularly limited, and an anionic emulsifier and a nonionic emulsifier are preferred.

The anionic emulsifier can include, for instance, the following. Sodium alkylbenzene sulfonate, sodium alkyl diphenyl ether di sulfonate, sodium alkyl sulfate, sodium polyoxyethylene alkyl sulfate, sodium polyoxyethylene nonylphenyl ether sulfate, sodium sarcosinate, fatty acid potassium, fatty acid sodium, dipotassium alkenyl succinate, rosin acid soap, sodium polyoxyethylene alkyl phosphate, calcium polyoxyethylene alkyl calcium phosphate . . . etc.

The nonionic emulsifier can include, for instance: polyoxyethylene alkyl ether, polyoxyethylene distyrenated phenyl ether, or polyoxyethylene tribenzylphenyl ether. These emulsifiers can be used alone, and can also be used in a combination of 2 or more.

The free-radical polymerization initiator used in the polymerization of the (meth)acrylate component for composite rubber can include, for instance: an azo-based initiator, peroxide, and a redox-based initiator formed by the combination of peroxide and a reducing agent. These can be used alone or in a combination of 2 or more. Among these, from the perspective of inhibiting outgassing of the resin composition, an azo-based initiator or a redox-based initiator is preferred.

The azo-based initiator can include, for instance, the following. An oil-soluble azo-based initiator such as 2,2'-azobisisobutyronitrile or 2,2'-azobis(2-methyl propionic acid)dimethyl ester; a water-soluble azo-based initiator such as 4,4'-azobis(4-cyanopentanoic acid), 2,2'-azobis[N-(2-carboxymethyl)-2-methylpropionamidine]hydrate, 2,2'-azobis-(N,N'-dimethylene isobutyl amidine)dihydrochloride, or 2,2'-azobis[2-(2-imidazolin-2-yl)propane]dihydrochloride. These can be used alone or in a combination of 2 or more.

The peroxide can include, for instance, the following. Inorganic peroxide such as hydrogen peroxide, potassium persulfate, or ammonium persulfate, or organic peroxide such as diisopropylbenzene hydroperoxide, p-menthane hydroperoxide, cumene hydroperoxide, tert-butyl hydroperoxide, succinic acid peroxide, tert-butyl peroxy neodecanoate, tert-butyl peroxyneoheptanoate, tert-butyl peroxypivalate, peroxy-2-ethylhexanoate-1,1,3,3-tetramethylbutyl, or tert-butyl peroxy-2-ethylhexanoate. These peroxides can be used alone, and can also be used in a combination of 2 or more.

In the case that the redox-based initiator is formed by the combination of peroxide and a reducing agent, a reducing agent such as the above peroxide and sodium sulphoxylate formaldehyde, L-ascorbic acid, fructose, glucose, sorbose, or inositol is preferably combined with ferrous sulfate-ethylenediaminetetraacetic acid disodium salt for use.

These reducing agents can be used alone, and can also be used in a combination of 2 or more. Moreover, when rongalite is used as the reducing agent, from the perspective of inhibiting outgassing of the resin composition, the usage amount is preferably reduced as much as possible.

When an azo-based initiator is used, based on 100 parts by mass of the composite rubber, the usage amount thereof is preferably 0.01 parts by mass to 1 part by mass.

When a redox-based initiator is used, based on 100 parts by mass of the (meth)acrylate for composite rubber, the usage amount of the peroxide is preferably 0.01 parts by mass to 10 parts by mass. Based on a total of 100 parts by mass of the composite rubber, the usage amount of the reducing agent is preferably 0.01 parts by mass to 1 part by mass.

The ratio "B1/B2" of the polyorganosiloxane (B1) and the polyalkyl (meth)acrylate (B2) in the composite rubber is preferably "74/26 to 99/1" mass %, more preferably "80/20 to 95/5" mass %. By setting the ratio of "B1/B2" to "74/26 to 99/1" mass %, the impact resistance of the molded article obtained by performing molding is good, which is preferred.

[Graft Copolymer]

The graft copolymer containing rubber of the invention can be obtained by performing graft polymerization on 1 or more vinyl monomers in the presence of rubber containing polyorganosiloxane. Therefore, in the graft copolymer of the invention, the graft portion is formed by the polymer of 1 or more vinyl monomers. Hereinafter, the vinyl monomer is described. However, "polyfunctional vinyl monomer" can be used as the vinyl monomer.

In the following description, a graft copolymer ($G_{F1}$), a graft copolymer ($G_{F2}$), a graft copolymer ($G_{F3}$) of "1st form", "2nd form", and "3rd form" of the 1st invention group are sometimes collectively referred to as a graft copolymer ($G_F$). Moreover, the graft copolymer of the 2nd invention group is referred to as a graft copolymer ($G_S$).

In the 1st invention group, the volume-average particle size of the graft copolymer ($G_F$) is 300 nm to 2000 nm. The volume-average particle size is preferably 400 nm to 1000 nm, more preferably 400 nm to 800 nm, and still more preferably 410 nm to 550 nm. If the volume-average particle size of the graft copolymer ($G_F$) is 300 nm or more, then the impact resistance (in particular low-temperature impact resistance) of the molded article obtained by adding the graft copolymer ($G_F$) in the thermoplastic resin is good. Moreover, if the volume-average particle size of the graft copolymer ($G_F$) is 2000 nm or less, then the color rendering and the impact resistance (in particular low-temperature impact resistance) of the molded article obtained by adding the graft copolymer ($G_F$) in the thermoplastic resin are good, and the surface appearance thereof is also good.

In the 1st invention group, the content of the "polyorganosiloxane" in 100 mass % of the graft copolymer ($G_F$) is 70 mass % to 98 mass %. The content is preferably 70 mass % to 90 mass %, more preferably 75 mass % to 85 mass %. When the content of the polyorganosiloxane is 70 mass % or more, the flame retardance, the slidability, and the impact strength at low temperature of the molded article are good. Moreover, when the content of the polyorganosiloxane is 98 mass % or less, the surface appearance of the molded article is good, which is preferred.

In the 1st invention group, the content of the "rubber containing polyorganosiloxane" in 100 mass % of the graft copolymer ($G_F$) is preferably 71 mass % to 99 mass %, more preferably 85 mass % to 99 mass %. If the content of the rubber containing polyorganosiloxane is 71 mass % or more, then the impact strength of the molded article at low temperature is sufficient. Moreover, if the content of the rubber containing polyorganosiloxane is 99 mass % or less, then the surface appearance of the molded article is good, which is preferred.

[Grafting Rate]

The grafting rate of the graft copolymer ($G_{F1}$) of the "1st form" of the 1st invention group is 10 mass % or less. If the grafting rate is 10 mass % or less, then the slidability and the flame retardance of the molded article can be increased. The grafting rate is preferably −20 mass % or more. The grafting rate is preferably −20 mass % to 8 mass %, more preferably −20 mass % to 5 mass %, and still more preferably −5 mass % to 5 mass %. By setting the grafting rate within the range, the obtained molded article can display high impact resistance, slidability, and flame retardance.

$$\text{Grafting rate} = \frac{(wa - wo \times R/100)}{(wo \times R/100)} \times 100 \qquad (1)$$

wa: mass (g) of acetone insoluble matter of sample,
wo: total amount (g) of sample, R: fraction (mass %) of rubber containing the polyorganosiloxane (B1) in the added raw material in the production of the graft copolymer.

Moreover, as described above, the grafting rate in the invention is a value calculated according to the mass wa of the acetone insoluble matter and the fraction R of the rubber in the added raw material obtained via experimental methods. In theory, the mass wa of the acetone insoluble matter is equivalent to the sum of the mass wr of the rubber containing polyorganosiloxane and the mass wv of the component derived from the vinyl monomer reacted in a graft polymerization with the rubber containing polyorganosiloxane, and "wo×R/100" is equivalent to the mass of the extracted rubber containing polyorganosiloxane.

However, in actuality, in the sample total amount wo, in addition to the graft copolymer, a byproduct or an unreacted raw material of the polymerization reaction is also included, and therefore the situation in which the value of "wo×R/100" is greater than "the mass wa of the acetone insoluble matter of the sample" can also be expected, and the situation in which the grafting rate obtained via an experimental method is a negative value may also occur.

To set the value of the grafting rate within the above range, the methods of the following (1) to (4) are provided.

(1) A method in which when the target value of the content of the rubber containing the polyorganosiloxane (B1) based on 100 mass % of the graft copolymer ($G_F$) is 85 mass % to 99 mass %, based on 100 mass % of the monomer raw material for the polyorganosiloxane (B1), the usage amount of the siloxane-based crosslinking agent is set to 0 mass % to 30 mass %, preferably set to 0.1 mass % to 10 mass %, and based on 100 mass % of the monomer raw material for the graft copolymer ($G_F$), the usage amount of the silane compound containing a vinyl-based polymerizable group is set to 0.7 mass % to 9.8 mass %, the usage amount of the polyfunctional vinyl monomer is set to greater than 0 mass % and less than 5 mass %, preferably set to 0.1 mass % or more and 3 mass % or less.

(2) A method in which when the target value of the content of the rubber containing the polyorganosiloxane (B1) based on 100 mass % of the graft copolymer ($G_F$) is less than 85 mass %, when the grafting vinyl monomer contains a polyfunctional vinyl monomer, based on 100 mass % of the monomer raw material for the graft copolymer ($G_F$), the usage amount of the polyfunctional vinyl monomer is set to greater than 0 mass % and 4 mass % or less, preferably set to 0.1 mass % to 3 mass %, more preferably set to 0.1 mass % to 2 mass %, and still more preferably set to 0.1 mass % to 1 mass %.

(3) A method in which when the target value of the content of the rubber containing the polyorganosiloxane (B1) based on 100 mass % of the graft copolymer ($G_F$) is less than 85 mass %, the grafting vinyl monomer does not contain a polyfunctional vinyl monomer, when the rubber containing the polyorganosiloxane (B1) is a composite rubber containing the polyorganosiloxane (B1) and the polyalkyl (meth)acrylate (B2), based on 100 mass % of the monomer raw material for the graft copolymer ($G_F$), the total usage amount of the polyfunctional vinyl monomer in the (meth)acrylate component for composite rubber and the grafting vinyl monomer is set to greater than 0 mass % and 4 mass % or less, preferably set to 0.1 mass % to 3 mass %, more preferably set to 0.1 mass % to 2 mass %, and still more preferably set to 0.1 mass % to 1 mass %.

(4) A method in which when the target value of the content of the rubber containing the polyorganosiloxane (B1) based on 100 mass % of the graft copolymer ($G_F$) is less than 85 mass %, the grafting vinyl monomer does not contain a polyfunctional vinyl monomer, when the rubber containing the polyorganosiloxane (B1) is a rubber without the polyalkyl (meth)acrylate (B2), based on 100 mass % of the monomer raw material for the polyorganosiloxane (B1), the usage amount of the siloxane-based crosslinking agent is set to 0 mass % to 1.8 mass %, preferably set to 0.1 mass % to 1.6 mass %, and based on 100 mass % of the monomer raw material for the graft copolymer ($G_F$), the usage amount of the silane compound containing a vinyl-based polymerizable group is set to 0.7 mass % to 5 mass %, preferably set to 0.7 mass % to 1.5 mass %.

[Acetone Soluble Matter]

The acetone soluble matter of the graft copolymer ($G_{F2}$) of the "2nd form" of the 1st invention group is 5.0 mass % or more and 30.0 mass % or less. The acetone soluble matter is more preferably 5.0 mass % or more and 20.0 mass % or less. By setting the acetone soluble matter to 5.0 mass % or more and 30.0 mass % or less, the slidability, the impact resistance, and the flame retardance of the molded article obtained by adding the graft copolymer ($G_{F2}$) in the thermoplastic resin are good. When such a graft copolymer ($G_{F2}$) is desired, the amounts and the types of the silane compound containing a vinyl-based polymerizable group and the polyfunctional vinyl monomer need to be suitably selected. Specifically, based on 100 mass % of the monomer raw material for the graft copolymer ($G_F$), the usage amount of the silane compound containing a vinyl-based polymerizable group is set to 0.7 mass % to 9.8 mass %, based on 100 mass % of the monomer raw material for the polyorganosiloxane (B1), the usage amount of the siloxane-based crosslinking agent is set to 0 mass % to 30 mass %, preferably set to 0.1 mass % to 10 mass %, and based on 100 mass % of the monomer raw material for the graft copolymer ($G_F$), the usage amount of the polyfunctional vinyl monomer is set to greater than 0 mass % and less than 5 mass %, preferably set to 0.1 mass % or more and 3 mass % or less. As a result, a graft copolymer for which the acetone soluble matter is 5.0 mass % or more and 30.0 mass % or less can be obtained. The measuring method of the acetone soluble matter of the graft copolymer is described later.

In the 1st invention group, the content of the component derived from the polyfunctional vinyl monomer in 100 mass % of the graft copolymer ($G_F$) is not particularly limited, but is preferably 0 mass % or more and 10 mass % or less, more preferably greater than 0 mass % and less than 5 mass %, still more preferably greater than 0 mass % and 3 mass % or less, still yet more preferably 0.1 mass % or more and 1.5 mass % or less, and most preferably 0.1 mass % or more and 1.0 mass % or less. By setting the content of the component derived from the polyfunctional vinyl monomer to 0 mass % or more and 10 mass % or less, the obtained molded article shows high impact resistance and slidability.

The content of the component derived from the polyfunctional vinyl monomer in 100 mass % of the graft copolymer ($G_{F3}$) of the "3rd form" of the 1st invention group is greater than 0 mass % and less than 5 mass %, preferably 0.01 mass % or more and 3 mass % or less. By setting the content of the component derived from the polyfunctional vinyl monomer within the range, the obtained molded article shows high impact resistance, slidability, and flame retardance.

In the 1st invention group, the content of the component derived from the silane compound containing a vinyl-based polymerizable group in 100 mass % of the graft copolymer ($G_F$) is not particularly limited, but is preferably 0.7 mass % to 9.8 mass %, more preferably 0.7 mass % to 5 mass %, and still more preferably 0.7 mass % to 1.5 mass %.

In the 2nd invention group, the mass-average particle size of the latex of the graft copolymer ($G_S$) is 300 nm to 2000 nm. If the mass-average particle size of the latex is 300 nm or more, then the color rendering of the molded article obtained from the thermoplastic resin composition is good, and if the mass-average particle size of the latex is 2000 nm or less, then the impact resistance of the molded article at low temperature is good. The mass-average particle size of the latex is preferably 400 nm to 2000 nm, more preferably 400 nm to 1000 nm, still more preferably 410 nm to 650 nm, and still yet more preferably 420 nm to 550 nm.

In the 2nd invention group, the particle size distribution (mass-average particle size Dw/number-average particle size Dn) of the latex of the graft copolymer ($G_S$) is preferably 1.0 to 2.0, more preferably 1.0 to 1.5. If the particle size distribution (Dw/Dn) of the latex is 2.0 or less, then the color rendering (pigment colorability) of the molded article obtained from the thermoplastic resin composition is good. Moreover, the measuring methods of the mass-average particle size Dw and the number-average particle size Dn are described later.

In the 2nd invention group, the content of the "polyorganosiloxane" in the graft copolymer ($G_S$) is 40 mass % to 95 mass %. If the content is 40 mass % or more, then the slidability of the molded article is sufficiently shown, and the impact resistance at low temperature is also good. Moreover, if the content is 95 mass % or less, then the color rendering (pigment colorability) of the molded article is good. The content is preferably 41 mass % to 74 mass %, more preferably 50 mass % to 70 mass %.

In the 2nd invention group, the content of the "rubber containing polyorganosiloxane" in 100 mass % of the graft copolymer ($G_S$) is preferably 65 mass % to 99 mass %, more preferably 80 mass % to 95 mass %. If the content of the rubber containing polyorganosiloxane is 65 mass % or more, then the impact strength of the molded article at low temperature is sufficient. Moreover, if the content is 99 mass % or less, then the surface appearance of the molded article is good, which is preferred.

In the invention, the rubber containing the polyorganosiloxane (B1) is preferably a composite rubber containing the polyorganosiloxane (B1) and the polyalkyl (meth)acrylate (B2). Moreover, a composite rubber containing polyorganosiloxane and polyalkyl acrylate is more preferred, and a composite rubber containing polyorganosiloxane and polybutylacrylate is still more preferred. If the rubber containing the polyorganosiloxane (B1) is a composite rubber, then the impact resistance of the molded article is good. Moreover, if the rubber containing the polyorganosiloxane (B1) is a composite rubber, then the flame retardance of the molded article is good.

In the graft copolymer of the invention, the graft portion is formed by the polymer of 1 or more vinyl monomers. The glass transition temperature of the polymer represented by the above FOX equation is greater than 0° C., preferably 50° C. or more. The vinyl monomer used in the graft polymerization is not particularly limited, and can include, for instance, the following. An aromatic vinyl monomer such as styrene, α-methyl styrene, p-methyl styrene, p-tert-butyl styrene, p-methoxy styrene, o-methoxystyrene, 2,4-dimethyl styrene, chlorostyrene, bromostyrene, vinyltoluene, vinyl naphthalene, or vinylanthracene; a (meth)acrylate such as methyl (meth)acrylate, ethyl (meth)acrylate, butyl (meth) acrylate, 2-ethylhexyl (meth)acrylate, phenyl (meth)acrylate, benzyl (meth)acrylate, 4-tert-butylphenyl (meth)acrylate, monobromophenyl (meth)acrylate, dibromophenyl (meth)acrylate, 2,4,6-tribromophenyl (meth)acrylate, monochlorophenyl (meth)acrylate, dichlorophenyl (meth)acrylate, trichlorophenyl (meth)acrylate, or naphthalene (meth) acrylate; a monomer containing a carboxy group such as (meth)acrylic acid or carboxyethyl (meth)acrylate; a cyanide vinyl monomer such as (meth)acrylonitrile; a vinyl ether monomer such as vinyl methyl ether or ethyl vinyl ether; a vinyl carboxylate monomer such as vinyl benzoate, vinyl acetate, or vinyl butyrate; a vinyl monomer having a glycidyl group such as glycidyl (meth)acrylate or allyl glycidyl ether; an olefin such as ethylene, propylene, or butene. These vinyl-based monomers can be used alone, and can also be used in a combination of 2 or more.

When 2 or more are used, the vinyl monomer mixture can also contain the "polyfunctional vinyl monomer" as needed. The polyfunctional vinyl monomer can include, for instance, the following. Allyl (meth)acrylate, triallyl cyanurate, triallyl isocyanurate, divinyl benzene, diallyl phthalate, ethylene glycol di(meth)acrylate, propylene glycol di(meth)acrylate, 1,3-butanediol di(meth)acrylate, 1,4-butanediol di(meth) acrylate, 1,6-hexanediol di(meth)acrylate, triallyl trimellitate. These can be used alone or in a combination of 2 or more.

Among these, when 1 or more vinyl monomers contains (meth)acrylate such as methyl (meth)acrylate, the compatibility and the dispersibility of the obtained graft copolymer in the thermoplastic resin (A) such as a polycarbonate-based resin are excellent. Moreover, when 1 or more vinyl monomers contain an aromatic vinyl monomer such as styrene, the flame retardance of the molded article obtained by molding a thermoplastic resin composition is excellent. Therefore, preferably, these vinyl monomers are used alone, or these vinyl monomers are used together.

In the raw material for the graft polymerization, various chain-transfer agents and graft-linking agents for adjusting the molecular weight and grafting rate of the graft polymer can be added.

[Production Method of Graft Copolymer]

The polymerization method of the graft portion can include, for instance, a method in which 1 or more vinyl monomers for graft polymerization are added in the latex of the rubber containing polyorganosiloxane, and polymerization is performed in 1 stage or a plurality of stages. When polymerization is performed in a plurality of stages, preferably, the 1 or more vinyl monomers for graft polymerization are divided and then added in the latex of the polyorganosiloxane-based rubber stepwise or continuously to perform polymerization. The polymerization stability of such a polymerization method is good, and the latex of a graft copolymer having the desired particle size and particle size distribution can be obtained in a stable manner.

During the polymerization of the graft portion, an emulsifier can be further added in the raw material as needed. The emulsifier can include, for instance, the same emulsifier above used in the production of the composite rubber, and an anionic emulsifier and a nonionic emulsifier are preferred. Based on 100 parts by mass of the vinyl monomer for graft polymerization, the usage amount of the emulsifier is preferably 0.1 parts by mass to 10 parts by mass, more preferably 0.2 parts by mass to 5 parts by mass.

The polymerization initiator for the polymerization of the graft portion can include, for instance, the same polymerization initiator used in the production of the composite rubber, and an azo-based initiator and a redox-based initiator are preferred.

When the powder of the graft copolymer is recycled from the latex of the graft copolymer, any method of a spray drying method and a coagulation method can be used.

The spray drying method is a method in which the latex of the graft copolymer is sprayed in a dryer in fine droplets and a heating gas for drying is blown thereto to perform drying. The method of generating the fine droplets can include, for instance, a rotating disk, a pressure nozzle, a dual fluid nozzle, or a pressurized dual fluid nozzle. The capacity of the dryer can be any of the small capacity used in laboratories to the large capacity used in industries. The temperature of the heating gas for drying is preferably 200° C. or less, more preferably 120° C. to 180° C.

Alternatively, the latexes of 2 or more graft copolymers respectively produced can also be spray dried together. Moreover, to prevent blocking during spray drying and to increase powder characteristics such as bulk specific gravity, any component such as silicon dioxide can also be added in the latex of the graft copolymer to perform spray drying.

The coagulation method is a method in which the latex of the graft copolymer is condensated to separate the graft copolymer, and then recycling and drying are performed. First, the latex of the graft copolymer is put in hot water in which a coagulant is dissolved to perform salting and solidification, so as to separate the graft copolymer. Then, dehydration . . . etc. is performed on the separated moist graft copolymer, and then the graft copolymer for which the water amount is reduced is recycled. Drying is performed on the recycled graft copolymer using a dehydration press or a hot air dryer.

The coagulant can include inorganic salt such as aluminum chloride, aluminum sulfate, sodium sulfate, magnesium sulfate, or sodium nitrate, organic salt such as calcium acetate, or acid such as sulfuric acid, and calcium acetate is more preferred. These coagulants can be used alone, and can also be used in a combination of 2 or more. When a coagulant is also used, the selection of a combination in which a water-insoluble salt is not formed is needed. For instance, if calcium acetate is used with sulphuric acid or sodium salt thereof, then water-insoluble calcium salt is formed, which is unsatisfactory.

The above coagulant is often used as an aqueous solution. From the perspective of coagulating the graft copolymer in a stable manner and performing recycling, the concentration of the aqueous coagulant solution is preferably 0.1 mass % or more, more preferably 1 mass % or more. Moreover, if the amount of the coagulant remaining in the recycled graft copolymer is large, then the thermal decomposition resistance of the molded article is degraded. As a result, the concentration of the aqueous coagulant solution is preferably 20 mass % or less, more preferably 15 mass % or less. The amount of the aqueous coagulant solution based on the latex is not particularly limited, and is preferably 10 parts by mass or more and 500 parts by mass or less based on 100 parts by mass of the latex.

The method of bringing the latex in contact with the aqueous coagulant solution is not particularly limited, and the following methods can generally be included. (1) A method in which the aqueous coagulant solution is stirred while the latex is continuously added therein and a certain time is held; (2) a method in which the aqueous coagulant solution and the latex are continuously injected into a container provided with a stirrer at a fixed ratio to continuously extract a mixture containing condensated polymer and water from the container while the aqueous coagulant solution and the latex are in contact with each other. The temperature when the latex and the aqueous coagulant solution are in contact is not particularly limited, but is preferably 30° C. or more and 100° C. or less. The contact time is not particularly limited.

Washing is performed on the coagulated graft copolymer using about 1 mass to about 100 mass-fold of water, and drying is performed on the filtered moist graft copolymer using, for instance, a flow dryer or a dehydration press. The drying temperature and the drying time only need to be suitably decided according to the Tg of the obtained graft copolymer. Moreover, the graft copolymer discharged from the dehydration press or the extruder can also not be recycled and be directly sent to the extruder or the molding machine producing the resin composition, and be mixed with the thermoplastic resin to obtain the molded article.

In the invention, from the perspective of thermal decomposition resistance of the resin composition obtained by mixing with a thermoplastic resin, the graft copolymer is preferably recycled using a coagulation method.

In the powder of the graft copolymer recycled via the above method, when graft polymerization is performed on the vinyl monomer, a (co)polymer formed by performing polymerization that does not react in graft bonding with the rubber containing polyorganosiloxane is sometimes included.

<Thermoplastic Resin Composition>

The graft copolymer of the 1st invention group can be mixed with the thermoplastic resin (A) as the thermoplastic resin composition. The thermoplastic resin composition is preferably a thermoplastic resin composition containing the thermoplastic resin (A), the graft copolymer ($G_F$), the fluorine-based resin (C), and the flame retardant (D).

[Thermoplastic Resin (A)]

The thermoplastic resin (A) can include, for instance, the following. An olefin-based resin such as polypropylene (PP) or polyethylene (PE); a styrene (St)-based resin such as polystyrene (PS), high-impact polystyrene (HIPS), a (meth) acrylate-styrene copolymer (MS), a styrene-acrylonitrile copolymer (SAN), a styrene-maleic anhydride copolymer (SMA), an acrylonitrile-butadiene-styrene copolymer (ABS), an acrylate-styrene-acrylonitrile copolymer (ASA), or an acrylonitrile-ethylene-propylene rubber-styrene copolymer (AES); an acrylic acid (Ac)-based resin such as polymethyl methacrylate (PMMA); a polycarbonate-based resin (PC-based resin); a polyamide (PA) resin; a PEs resin such as polyethylene terephthalate (PET), polybutylene terephthalate (PBT), or polylactic acid (PLA); an engineering plastic such as a (modified) polyphenylene ether ((m-) PPE) resin, a polyoxymethylene (POM) resin, a polysulfone (PSO) resin, a polyarylate (PAr) resin, a polyphenylene sulfide (PPS) resin, or a thermoplastic polyurethane (PU) resin; a thermoplastic elastomer (TPE) such as a styrene-based elastomer, an olefin-based elastomer, a vinyl chloride-based elastomer, a urethane-based elastomer, a polyester-based elastomer, a polyamide-based elastomer, a fluorine-based elastomer, 1,2-polybutadiene, or trans-1,4-polyisoprene; a polymer alloy such as an alloy of a PC resin and an St-based resin such as PC/ABS, an alloy of a PVC-based resin and an St-based resin such as polyvinyl chloride (PVC)/ABS, an alloy of a PA resin and an St-based resin such as PA/ABS, an alloy of a PA resin and TPE, an alloy of a PA resin and a polyolefin-based resin such as PA/PP, an alloy of a PC resin and a PEs resin such as PC/PBT, an alloy between olefin-based resins such as a polyolefin-based resin/TPE and PP/PE, an alloy between PPE-based resins such as PPE/HIPS and PPE/PBT and PPE/PA, or an alloy of a PVC-based resin and an Ac-based resin such as PVC/PMMA; a PVC-based resin such as a rigid vinyl chloride-based resin, a semi-rigid vinyl chloride-based resin, or a soft vinyl chloride-based resin.

Among these thermoplastic resins (A), from the perspective of increasing the impact resistance and the flame retardance of the obtained molded article, a thermoplastic resin having at least one bond selected from a carbonate bond, an ester bond, and an amide bond is preferred. The thermoplastic resin having at least one bond selected from a carbonate bond, an ester bond, and an amide bond can include, for instance, a PC-based rein, PBT, PET, a PA resin, or PLA. Moreover, a resin referred to as an alloy blend containing these resins can also be used. Specifically, a PC-based resin containing 50 mass % or more of an aromatic polycarbonate unit is more preferred.

The PC-based resin is a thermoplastic aromatic polycarbonate polymer or copolymer that can have a branched chain, and is obtained by reacting an aromatic hydroxy compound and phosgene or the diester of carbonic acid, or reacting an aromatic hydroxy compound and a small amount of a polyhydroxy compound and phosgene or the diester of carbonic acid. The production method of the aromatic polycarbonate resin is not particularly limited, and a known method can be used, i.e., a phosgene method (interfacial polymerization method) or a melting method (transesterification method) . . . etc. The terminal OH-group amount of the PC-based resin has the tendency of affecting, for instance, thermal stability and hydrolytic stability, and therefore in the invention, the following aromatic polycarbonate resin can also be used: an aromatic polycarbonate resin produced by a melting method and for which the terminal OH-group amount is adjusted by, for instance, adjusting the degree of decompression during reaction.

The PC-based rein can include, for instance, the following. Iupilon S-1000, Iupilon S-2000, Iupilon S-3000, Iupilon H-3000, or Iupilon H-4000 made by Mitsubishi Engineering-Plastics (ltd.); or Panlite L1250, Panlite L1225, or Panlite K1300 . . . etc. made by Teijin Chemicals (ltd.)

The usage amount of the graft copolymer ($G_F$) based on the thermoplastic resin (A) is preferably based on 100 parts by mass of the thermoplastic resin (A), and 0.1 parts by mass to 12 parts by mass of the graft copolymer ($G_F$) is added, preferably 0.5 parts by mass to 10 parts by mass, and more preferably 1 part by mass to 8 parts by mass. If the usage amount of the graft copolymer ($G_F$) is 0.1 parts by mass to 12 parts by mass, then a resin composition capable of providing a molded article having excellent impact resistance and surface appearance can be obtained.

[Fluorine-Based Resin (C)]

The fluorine-based resin (C) can be used for the object of preventing dripping during burning. The fluorine-based resin (C) can adopt a known fluorine-based resin, and an appropriately synthesized product can be used, and a commercial product can also be used. Commercial products can include, for instance, the following. Polytetrafluoroethylene such as "Polyflon FA-500" (trade name, made by Daikin Industries (ltd.)); SAN-modified polytetrafluoroethylene such as "BLENDEX B449" (trade name, made by Galata Chemicals Corporation); acrylic acid-modified polytetrafluoroethylene such as "Metablen A-3000", "Metablen A-3750", and "Metablen A-3800" (trade names, made by Mitsubishi Rayon (ltd.)) These fluorine-based resins (C) can be used alone, and can also be used in a combination of 2 or more.

Among these fluorine-based resins (C), from the perspective of excellent dispersibility of the obtained molded article and excellent mechanical properties, heat resistance, and flame retardance of the molded article, SAN-modified polytetrafluoroethylene or acrylic acid-modified polytetrafluoroethylene is preferred, and acrylic acid-modified polytetrafluoroethylene is more preferred.

The content of polytetrafluoroethylene in the SAN-modified polytetrafluoroethylene or the acrylic acid-modified polytetrafluoroethylene is preferably 10 mass % to 80 mass %, more preferably 20 mass % to 70 mass % based on 100 mass % of the fluorine-based resin (C). If the content is 10 mass % or more, then the flame retardance of the obtained molded article is excellent. Moreover, if the content is 80 mass % or less, then the appearance of the obtained molded article is excellent.

Based on 100 parts by mass of the thermoplastic resin (A), the amount of the fluorine-based resin (C) is preferably 0.01 parts by mass to 5 parts by mass, more preferably 0.1 parts by mass to 5 part by mass, and still more preferably 0.3 parts by mass to 2 parts by mass. If the amount is 0.01 parts by mass or more, then the flame retardance of the obtained molded article is excellent. Moreover, if the amount is 5 parts by mass or less, then the original characteristics of the thermoplastic resin (A) are not compromised.

[Flame Retardant (D)]

The flame retardant (D) can adopt a known flame retardant, and can include, for instance, the following. A halogen-based flame retardant containing a combination of a halogen-based compound such as halogenated bisphenol A, halogenated polycarbonate oligomer, or a brominated epoxy compound and a flame retardant auxiliary such as antimony oxide; an organic salt-based flame retardant; a phosphorus-based flame retardant such as a phosphate-based flame retardant or a halogenated phosphate-type flame retardant; a sulfonic acid-based flame retardant such as metal salt of an aromatic sulfonic acid or metal salt of perfluoroalkane sulfonic acid; a silicone-based flame retardant such as organosiloxane such as a branched-type phenyl silicone compound or a phenyl silicone-based resin.

Among these flame retardants (D), in terms of non-halogen-based or excellent flame retardance of the obtained molded article, a phosphorus-based flame retardant such as a phosphate-based flame retardant is preferred; furthermore, in terms of non-phosphorous-based, among organic metal salt-based flame retardants such as the metal salt of aromatic sulfonic acid and the metal salt of perfluoroalkane sulfonic acid, an organic metal salt-based flame retardant is more preferred.

Based on 100 parts by mass of the thermoplastic resin (A), the amount of the flame retardant (D) is preferably 0.01 parts by mass to 10 parts by mass, more preferably 0.1 parts by mass to 10 parts by mass. If the amount is 0.01 parts by mass or more, then the flame retardance of the obtained molded article is excellent. Moreover, if the amount is 10 parts by mass or less, then the original characteristics of the thermoplastic resin (A) are not compromised. If the amount is too small, then the flame retardance of the obtained molded article is reduced. Moreover, if the amount is too large, then the mechanical strength of the resin molded article is reduced.

The phosphorous-based flame retardant can include, for instance: red phosphorus, coated red phosphorus, a polyphosphate-based compound, a phosphate-based compound, a phosphite-based compound, a phosphinate-based compound, or a phosphazene-based compound. Among these, a phosphate-based compound is preferred. Examples of the phosphate-based compound can include, for instance, the following. Trimethyl phosphate, triethyl phosphate, tributyl phosphate, trioctyl phosphate, tributoxy ethyl phosphate, triphenyl phosphate, tricresyl phosphate, cresyldiphenylphosphate, octyldiphenylphosphate, isopropylphenyldiphosphate, tris(butoxyethyl)phosphate, triisobutylphosphate, bis-diphenyl(isopropylphenyl)phosphate, tris(isopropylphenyl)phosphate, 1,3-phenylene bis(diphenyl phosphate), 1,3-phenylene bis(di-2,6-xylyl phosphate), bisphenol A bis(diphenyl phosphate), resorcinol bis(diphenyl phosphate), octyl diphenyl phosphate, diethylene ethyl phosphate, dihydroxy propylene butyl phosphate, ethylene disodium phosphate, tert-butyl phenyl diphenyl phosphate, bis(tert-butylphenyl)phenyl phosphate, tris(tert-butylphenyl)phosphate, tris(chloroethyl)phosphate, tris(dichloropropyl)phosphate, tris(chloropropyl)phosphate, bis(2,3-dibromopropyl)-2,3-dichloropropyl phosphate . . . etc. These can be used alone or in a combination of 2 or more.

Based on 100 parts by mass of the thermoplastic resin (A), the amount of the phosphorus-based flame retardant is preferably within the range of 1 part by mass to 10 parts by mass, more preferably 2 parts by mass to 8 part by mass, and still more preferably 3 parts by mass to 6 parts by mass.

The organic metal salt-based flame retardant shows flame retardant effect via addition in a very small amount, and is therefore advantageous in preventing reduction in heat resistance of the molded article, and can sufficiently provide antistatic properties to the molded article. The most advantageous organic metal salt-based flame retardant in the invention is a fluorine-containing organic metal salt compound. The fluorine-containing organic metal salt compound refers to a metal salt compound containing an anion component and a cation component, the anion component contains organic acid having a fluorine-substituted hydrocarbon group, and the cation component contains a metal ion. In particular, metal salt of fluorine-substituted organic sulfonic acid, metal salt of fluorine-substituted organic sulfate, and metal salt of fluorine-substituted organophosphate are preferred. The fluorine-containing organic metal salt compounds can be used alone, and can also be used in a combination of 2 or more. In particular, metal salt of fluorine-substituted organic sulfonic acid is preferred, and metal salt of sulfonic acid having a perfluoroalkyl group is more preferred.

Moreover, the organic metal salt-based flame retardant other than the above fluorine-containing organic metal salt compound is preferably metal salt of organic sulfonic acid without a fluorine atom. The metal salt can include, for instance, metal salt of aliphatic sulfonic acid or metal salt of aromatic sulfonic acid. In particular, metal salt of aromatic sulfonic acid is preferred.

The metal type forming the metal ions of the organic metal salt-based flame retardant can include, for instance, an alkali metal such as sodium or potassium, or an alkaline earth metal such as calcium. Specifically, the organic metal salt-based flame retardant can include the following. Tetraethylammonium salt of potassium salt of 4-methyl-N-(4-methylphenyl)sulfonyl-benzenesulfonamide, potassium diphenyl sulfone-3-sulfonic acid, potassium diphenyl sulfone-3,3'-disulfonic acid, sodium p-toluenesulfonate, sodium perfluorobutane sulfonate, perfluoro butane sulfonic acid potassium salt, sodium perfluoro methyl butane sulfonate, potassium perfluoro methyl butane sulfonate, sodium perfluorooctanoate sulfonate, potassium perfluorooctanoate sulfonate, or perfluorobutanesulfonate . . . etc. Among these, potassium perfluorobutane sulfonate is preferred. These can be used alone or in a combination of 2 or more.

Based on 100 parts by mass of the thermoplastic resin (A), the amount of the organic metal salt-based flame retardant is preferably in the range of 0.01 parts by mass to 2 parts by mass, more preferably 0.03 parts by mass to 1 part by mass, and still more preferably 0.05 parts by mass to 0.5 parts by mass.

[Antioxidant (E)]

The thermoplastic resin composition of the 1st invention group can contain an antioxidant (E) as needed. The antioxidant (E) is a component as follows: not only for the object of inhibiting oxidative decomposition of the resin when a molded article is produced, but also for the object of increasing the flame retardance of the molded article. The antioxidant (E) only needs to be a general antioxidant used in molding, and is not particularly limited. Specific examples can include, for instance, the following. A phenol-based antioxidant such as tris[N-(3,5-di-tert-butyl-4-hydroxylbenzyl)]isocyanurate (made by ADEKA (ltd.), such as Adekastab AO-20), tetrakis[3-(3,5-di-tert-butyl-4-hydroxylphenyl)propionyloxymethyl]methane (made by BASF Corporation, such as Irganox1010), bis (3-tert-butyl-4-hydroxyl-5-methylbenzenepropionic acid)ethylene bis (oxyethylene) (made by BASF Corporation, such as Irganox 245), 3,5-di-tert-butyl-4-hydroxylphenyl octadecyl propionate (made by BASF Corporation, such as Irganox 1076), butylidene-1,1-bis-(2-methyl-4-hydroxyl-5-tert-butyl-phenyl (made by ADEKA (ltd.), such as Adekastab AO-40), or 1,1,3-tris(2-methyl-4-hydroxyl-5-tert-butylphenyl)butane (made by Yoshitomi Fine Chemicals (ltd.), such as Yoshinox 930); a phosphorus-based antioxidant such as bis(2,6-di-tert-butyl-4-methylphenyl)pentaerythritol diphosphite (made by ADEKA (ltd.), such as Adekastab PEP-36), tris(2,4-di-tert-butylphenyl)phosphite (made by ADEKA (ltd.), such as Adekastab 2112), or 2,2-methylene bis(4,6-di-tert-butyl phenyl)octyl phosphite (made by ADEKA (ltd.), such as Adekastab HP-10); a sulfur-based antioxidant such as 3,3'-thio-dilauryl dipropionate (made by Yoshitomi Fine Chemicals (ltd.), Yoshinox DLTP) or dimyristyl 3,3'-thiodipropionate (made by Yoshitomi Fine Chemicals (ltd.), Yoshinox DMTP) . . . etc.

Based on 100 parts by mass of the thermoplastic resin (A), the amount of the antioxidant (E) is preferably 0 parts by mass to 2 parts by mass, more preferably 0.01 parts by mass to 1 part by mass, and still more preferably 0.05 parts by mass to 0.8 parts by mass. By setting the amount to 2 parts by mass or less, reduction in impact resistance of the molded product can be inhibited.

[Other Additives]

The thermoplastic resin composition of the 1st invention group can further contain the following components as needed. A plasticizer or a lubricant; a release agent (such as pentaerythritol tetrastearate); a nucleating agent, an antistatic agent, a stabilizer, or a filler material; a reinforcing material (such as glass fiber, carbon fiber, mica, kaolin, talc, $CaCO_3$, and glass flake); pigment and paint. These can be used alone or in a combination of 2 or more.

[Preparation Method of Resin Composition]

The preparation method of the thermoplastic resin composition of the 1st invention group is not particularly limited. For instance, the following method can be used for the preparation: the thermoplastic resin (A), the graft copolymer $(G_F)$, and the optional fluorine-based resin (C), the flame retardant (D), the antioxidant (E), and various additives are mixed and dispersed using, for instance, a V-type stirrer or a Henschel mixer, and then melting and kneading are performed on the mixture via a mixing machine such as an extruder, a Banbury mixer, a pressure kneader, or a roller. The mixing of each of the above components can be implemented in batches or continuously, and the mixing order of each of the components is not particularly limited. The melt-kneaded product can be made into particles and used in various molding.

<Molded Article>

The forming method of the thermoplastic resin composition of the 1st invention group can include, for instance, a regular molding method used in the molding of a thermoplastic resin composition such as an injection molding method, an extrusion molding method, a blow molding method, or a calendar molding method.

The molded article of the 1st invention group has excellent impact resistance, flame retardance, and color rendering, and therefore can be extensively industrially applied as various materials in, for instance, the automotive sector, the OA machine sector, home appliances, and the electrical and electronics sector . . . etc. More specifically, the molded article can be used as an electronic machine part, an automobile structural member, an automobile interior part, and a light reflection plate. More specifically, the molded article can be used as an interior/exterior member such as a PC frame, a mobile phone frame, a personal digital assistant frame, a portable game console frame, a printer, or a photocopy machine.

<Slidability-Improving Agent>

The "slidability-improving agent (H)" of the 2nd invention group contains the powder of the above graft copolymer $(G_S)$. Since the polyorganosiloxane content of the graft copolymer $(G_S)$ is limited within a specific range, the mass-average particle size of the latex of the graft copolymer $(G_S)$ is limited within a specific range, and is therefore most suitable as a slidability-improving agent. Therefore, the effect of increasing the slidability is large, and the balance among color rendering (pigment colorability), molding appearance, and impact resistance is excellent. The rubber containing polyorganosiloxane for the production of the graft copolymer $(G_S)$ is preferably a composite rubber containing polyorganosiloxane and polyalkyl acrylate.

<Thermoplastic Resin Composition for Sliding Member>

The slidability-improving agent (H) of the 2nd invention group can be mixed with the thermoplastic resin (K) as the thermoplastic resin composition for a sliding member.

[Thermoplastic Resin (K)]

The thermoplastic resin (K) can include, for instance, an equivalent of the thermoplastic resin (A).

Among these, the following resins or alloys are preferred. An St-based resin, a PC-based resin, a PA resin, a PET resin, a PBT resin, an (m-)PPE resin, a POM resin, or a PU resin; an alloy of a PC-based resin and an St-based resin such as PC/ABS, an alloy of a PA resin and an St-based resin such as PA/ABS, an alloy of a PA resin and TPE, an alloy of a PA resin and a polyolefin-based resin such as PA/PP, an alloy of a PC resin and a PEs resin such as PC/PBT, or an alloy of PPE-based resins such as PPE/PBT or PPE/PA . . . etc. In particular, the thermoplastic resin (K) is more preferred since a PC-based rein shows the effect of the invention more significantly. These resins can be used alone, and can also be used in a combination of 2 or more.

The PC-based resin can include, for instance, a polymer obtained by reacting an aromatic dihydroxy compound and phosgene or carbonic acid diester, or reacting an aromatic dihydroxy compound and a small amount of a polyhydroxy compound and phosgene or carbonic acid diester. The PC-based resin can be any of straight chain or branched. Moreover, the polycarbonate-based resin can be any of a homopolymer or a copolymer.

The aromatic dihydroxy compound can include, for instance: 2,2-bis(4-hydroxyphenyl)propane (i.e., bisphenol A), tetramethyl bisphenol A, bis(4-hydroxyphenyl)-diisopropylbenzene, hydroquinone, resorcinol, and 4,4-dihydroxydiphenyl. These can be used alone or in a combination of 2 or more. Moreover, the aromatic dihydroxy compound can also adopt a compound to which 1 or more tetraalkylphosphonium sulfonate is bonded.

A branched PC-based resin can be obtained for the PC-based resin by only substituting a portion of the above aromatic dihydroxy compound using a branching agent. The branching agent can include, for instance, the following. A polyhydroxy compound such as phloroglucin, 4,6-dimethyl-2,4,6-tris(4-hydroxyphenyl)heptene-2, 4,6-dimethyl-2, 4, 6-tris(4-hydroxyphenyl)heptane, 2,6-dimethyl-2, 4, 6-tris(4-hydroxyphenyl)heptene-3, 1,3,5-tris(4-hydroxyphenyl)benzene, or 1,1,1-tris(4-hydroxyphenyl)ethane; 3,3-bis(4-hydroxyaryl)oxindole (i.e., isatin bisphenol), 5-chloroisatin, 5,7-dichloroisatin, and 5-bromoisatin. Based on the aromatic dihydroxy compound, the usage amount of the branching agent is generally 0.01 mol % to 10 mol %, preferably 0.1 mol % to 2 mol %.

From the perspective of heat resistance or flexibility, the PC-based resin is preferably a PC-based resin obtained from an aromatic dihydroxy compound containing bisphenol A. Moreover, the PC-based resin can adopt a copolymer for which a PC-based resin is used as the main body such as a copolymer of polycarbonate and a polymer or an oligomer having a siloxane structure. The PC-based resins can be used alone, and can also be used in a combination of 2 or more.

The viscosity-average molecular weight of the PC-based resin is preferably 16,000 to 30,000, more preferably 18,000 to 28,000. The viscosity-average molecular weight of the PC-based resin is a value obtained by converting solution viscosity measured at a temperature of 25° C. using dichloromethane as the solvent. In the case of a viscosity-average molecular weight of 30,000 or less, the melt flowability of the resin composition containing the slidability-improving agent tends to be good, and in the case of a viscosity-average molecular weight of 16,000 or more, the impact resistance of the molded article of the invention tends to be good.

The molecular weight of the PC-based resin can be adjusted by only substituting a portion of the above aromatic dihydroxy compound with a monovalent aromatic hydroxy compound such as m-methylphenol, p-methylphenol, m-propylphenol, p-propylphenol, p-tert-butylphenol, or p-long-chain alkyl-substituted phenol.

The production method of the PC-based resin is not particularly limited, and a known phosgene method (interfacial polymerization method) or melting method (transesterification method) can be used for the production. Moreover, the following aromatic polycarbonate resin can also be used: an aromatic polycarbonate resin produced by a melting method for which the amount of terminal OH-group is adjusted via, for instance, the degree of decompression during reaction.

[Thermoplastic Resin Composition]

The thermoplastic resin composition containing the slidability-improving agent of the 2nd invention group contains the above slidability-improving agent (H) and thermoplastic resin (K). In the thermoplastic resin composition, the content of the slidability-improving agent (H) is 4 mass % to 16 mass %, and the content of the thermoplastic resin (K) is 96 mass % to 84 mass %. If the content of the slidability-improving agent (H) is 4 mass % or more, then the slidability increasing effect of the sliding member is sufficient, and in the case of 16 mass % or less, the color rendering (pigment colorability) and the molding appearance of the sliding member are good.

In the thermoplastic resin composition, more preferably, the content of the slidability-improving agent (H) is 5.1 mass % to 16 mass %, and the content of the thermoplastic resin (K) is 94.9 mass % to 84 mass %. In the thermoplastic resin composition, even more preferably, the content of the slidability-improving agent (H) is 7 mass % to 15 mass %, and the content of the thermoplastic resin (K) is 93 mass % to 85 mass %.

In the above resin composition, the following components can be included without compromising the original objects. A reinforcing material or a filler such as glass fiber, metal fiber, metal flake, or carbon fiber; a phenol-based antioxidant such as 2,6-di-butyl-4-methylphenol or 4,4'-butylidene-bis (3-methyl-6-tert-butylphenol); a phosphite-based antioxidant such as tris(mixed phenyl, monophenyl, and dinile phenyl)phosphite or diphenyl-isodecyl phosphite; a sulfur-based antioxidant such as dilauryl thiodipropionate, dimyristyl thiodipropionate, or distearyl thiodipropionate; a benzotriazole-based UV absorber such as 2-hydroxy-4-octyloxybenzophenone or 2-(2-hydroxy-5-methylphenyl) benzotriazole; a light stabilizer such as bis((2,2,6,6)-tetramethyl-4-piperidyl); an antistatic agent such as oxyalkylamine or sulfonate; a lubricant such as ethylene bis stearamide or metal soap; a flame retardant such as tetrabromo phenol A, decabromophenyl oxide, tetrabromobisphenol A (TBA) epoxy oligomer, TBA polycarbonate oligomer, antimony trioxide, triphenyl phosphate (TPP), or phosphate ester; an anti-dripping agent such as polytetrafluoroethylene (sometimes referred to as "PTFE" hereinafter), a modified fluorine resin (such as PTFE modified by, for instance, a vinyl polymer) formed by mixing a rigid polymer obtained by performing polymerization on a vinyl monomer and a fluorine resin . . . etc.

[Preparation Method of Resin Composition]

The method of producing the thermoplastic resin composition of the 2nd invention group is not particularly limited, but a melt mixing method is preferably used. Moreover, a small amount of a solvent can also be used as needed.

Specifically, preparation can be made via, for instance, the following method: the slidability-improving agent (H) and the thermoplastic resin (K) used as necessary components are prepared in a predetermined amount, as well as any other optional components. First, a Henschel mixer or a roller . . . etc. is used to perform mixing. Then, an ordinary mixer such as a roller, a Banbury mixer, a single-screw extruder, or a twin-screw extruder is used to perform mixing on the obtained mixture. These can be operated in batches or continuously, and the mix order of each of the components is not particularly limited.

The thermoplastic resin composition of the invention is preferably a particle form <Molded Article>

The forming method of the thermoplastic resin composition of the 2nd invention group can include, for instance, a regular molding method used in the molding of a thermoplastic resin composition such as an injection molding method, an extrusion molding method, a blow molding method, or a calendar molding method.

Since the thermoplastic resin composition of the 2nd invention group contains the graft copolymer ($G_S$), the balance among slidability, color rendering (pigment colorability), impact resistance, and molding appearance is excellent. The application of the thermoplastic resin composition is not particularly limited, and the thermoplastic resin composition can be applied as various materials in, for instance, the automotive sector, the OA machine sector, home appliances, the electrical and electronics sector, building materials, toys, and office supplies. In particular, due to the excellent balance between slidability or color rendering and impact resistance, the thermoplastic resin composition can be used as a sliding member of, for instance, the following products. Parts of automobiles, OA machines, and electrical and electronic products, in particular bearings, gears, switches parts, camera module parts, sliding screws, gears, cams, pulleys, reels, bushes, partition sheets, rollers, bearings, bearing retainers, end surface materials of tape guide mechanical seals for audio tape recorders, valve seats for valves, V-rings, rod packings, piston rings, rotation axes and rotation sleeves for compressors, pistons, impellers, vanes, rotors, and guide rails . . . etc. of business machines/dynamic machines.

EXAMPLES

In the following, the invention is specifically described via examples and comparative examples. Example 1 to example 14 and comparative example 1 to comparative example 17 are related to the 1st invention group. Example 21 to example 29 and comparative example 21 to comparative example 27 are related to the 2nd invention group.

Before the examples, the various evaluation methods, production example 1 to production example 3, production example 5, and production example 6 of the latex of the organosiloxane rubber, and production example 4 of the powder containing polytetrafluoroethylene are described. In the following, "parts" and "%" represent "parts by mass" and "mass %" unless otherwise specified.

In the test pieces for each of the evaluations relating to the 1st invention group, the resin compositions (or particles thereof) were molded using a 100 t injection molding machine (SE-100DU made by Sumitomo Heavy Industries (ltd.)) under the conditions of a cylinder temperature of 310° C. and a mold temperature of 90° C.

In the test pieces for each of the evaluations relating to the 2nd invention group, the resin compositions (or particles thereof) were molded using a 100 t injection molding machine (SE-100DU made by Sumitomo Heavy Industries (ltd.)) under the conditions of a cylinder temperature of 280° C. and a mold temperature of 80° C.

<1. Evaluation Methods>

(1) Grafting rate

The grafting rate [%] is calculated via the above equation (1) according to the mass wa of the acetone insoluble matter and the fraction R of the rubber in the added raw material obtained via experimental methods.

(2) Solid content

Drying was performed on the latex of the polyorganosiloxane rubber having a mass of $w_1$ using a hot air dryer at 180° C. for 30 minutes to measure the mass $w_2$ of residue after drying, and the solid content [%] was calculated via the following equation.

$$\text{Solid content } [\%] = w_2/w_1 \times 100 \qquad (2).$$

(3) Mass-average particle size and particle size distribution (Dw/Dn)

A product formed by diluting "latex of polyorganosiloxane rubber" or "latex of graft copolymer" to a concentration of about 3% using deionized water was used as a sample, and the mass-average particle size Dw and the particle size distribution (Dw/Dn) of the latex were measured using the CHDF2000 particle size distribution analyzer made by US MATEC Corporation.

The measurement is performed under the following standard conditions recommended by MATEC Corporation.

Cartridge: capillary-type cartridge for particle separation (trade name: C-202)

carrier solution: dedicated carrier solution (trade name: 2XGR500)

liquid properties of carrier solution: substantially neutral flow velocity of carrier solution: 1.4 ml/min pressure of carrier solution: about 4,000 psi (2,600 kPa)

measured temperature: 35° C.

sample usage amount: 0.1 ml.

Moreover, the standard particle size matter adopts 12 particles for which the particle size is within the range of 40 nm to 800 nm, and the particle is monodispersed polystyrene made by DUKE Corporation for which the particle size is known.

(4) Acetone soluble matter

A centrifugal separator apparatus (CRG SERIES (trade name) made by Hitachi, Ltd.) was used to perform centrifugal separation on the following dispersion at 4° C. and 14,000 rpm for 30 minutes. The above dispersion is a dispersion obtained by dissolving 1 g of a powder of the graft copolymer in 50 g of acetone, and then performing 6 hours of reflow and extraction operations at 70° C. The separated acetone soluble matter was removed via decantation to obtain an acetone insoluble matter.

After 24 hours of drying was performed on the obtained acetone insoluble matter using a vacuum dryer at 50° C., the mass $w_3$ of the acetone insoluble matter was measured, and the acetone insoluble matter [%] in the powder of the graft copolymer was calculated via the following equation.

$$\text{Acetone soluble matter } [\%] = (1 - w_3) \times 100 \qquad (3).$$

(5) Volume-average particle size

The volume-average particle size of the graft copolymer was measured via the following method.

Dilution was performed on the latex of the graft copolymer using deionized water, and then the pitch diameter in the volume average was obtained using a laser diffraction scattering particle size distribution meter (SALD-7100 made by Shimadzu). The sample concentration of the latex is suitably adjusted by adjusting the sample concentration of the latex to a suitable range in the scattered light intensity monitor attached to the apparatus. The standard particle matter adopts monodispersed polystyrene for which the particle size is known, and 12 particles for which the particle size is within the range of 20 nm to 800 nm.

(6) Charpy Impact Strength

The Charpy impact strength of the test pieces (length: 80.0 mm, width: 10.0 mm, thickness: 4 mm, with V-notch) was measured at temperatures of 23° C. and −30° C. according to JIS K 7111.

(7) Total light transmittance

The total light transmittance in a D65 light source of the test pieces (length: 100 mm, width: 50 mm, thickness: 2 mm) was measured using a haze meter NDH4000 made by Nippon Denshoku Industries (ltd.) according to JIS K 7375.

(8) Color rendering (pigment colorability)

L* of the test pieces (length: 100 mm, width: 50 mm, thickness: 2 mm) was measured according to JIS Z 8729 (using the representation method of object color of an L*a*b* color system). The tristimulus values (XYZ) were measured according to the following measuring conditions of JISZ8722 using the spectroscopic colorimeter SE-2000 made by Nippon Denshoku Industries (ltd.). Then, the L* value was calculated using an Commission Internationale de I'Eclairage (CIE) color equation.

Apparatus: spectroscopic colorimeter SE-2000 (made by Nippon Denshoku Industries Co., Ltd., a method of after-sample light splitting of 0° to 45°)

measurement range: 380 nm to 780 nm, measurement light source: C light (2° field of view).

(9) Flame retardance

A UL-94V test was performed on 1/16-in. test pieces (length: 127 mm, width: 12.7 mm, thickness: 1.6 mm).

(10) Appearance (visual evaluation)

The flat panel of the test pieces (length: 100.0 mm, width: 50.0 mm, thickness: 2 mm) was molded, the appearance of the flow mark (striped pattern observed around the gate of the molded article) or the surface roughness was visually inspected, and evaluation was performed via the following criteria.

++: no visible flow mark or surface roughness.

+: slightly visible flow mark or surface roughness, but insignificant.

−: slightly significant flow mark or surface roughness.

−−: significant flow mark or surface roughness.

(11) Appearance (arithmetic mean roughness Ra of surface of molded article)

The flat panel of the test pieces (length: 100.0 mm, width: 50.0 mm, thickness: 2 mm) was molded as shown in FIG. 1, and the surface roughness of the flat panel was measured via a touch surface roughness meter (Surfcom1400D made by Tokyo Precision Industry (ltd.)) using a 1 μmR, 55° tapered diamond needle (010-2528) at a driving speed of 0.3 mm/sec at the locations of point A (near the gate) and point B (center). The measuring length was set to 4 mm, the cutoff wavelength was set to 0.8 mm, and the cutoff category was set to Gaussian. After tilt correction of the average line of the extraction curve was performed using a least-squares line, the arithmetic mean roughness (Ra) was measured according to a method of JIS B0601-2001, and the arithmetic mean roughness (Ra) was used as the indicator of slidability of the surface of the molded article.

(12) Slidability

The flat panel of the test pieces (length: 100 mm, width: 50 mm, thickness: 2 mm) was molded, and a pin-plate friction tester (made by Toyo Seiki Seisaku (ltd.)) was used to measure the friction F[N] at an installed load W[N]: 30 N, moving distance: 20 mm, moving speed: 2 mm/s, and a measuring temperature: 23° C., and the "dynamic friction coefficient" was measured via the following equation.

$$\text{Dynamic friction coefficient } [-] = F[N]/W[N] \qquad (4).$$

(13) Chemical resistance

The test pieces (length: 127 mm, width: 12.7 mm, thickness: 1.5 mm) were molded, and the chemical product for evaluation was coated on the test pieces at 23° C. via a ¼ ellipse method. After the test pieces were left to stand for 48 hours, "critical strain (%)" was obtained from the locations of damage or cracking on the test pieces and via the following equation. The chemical product for evaluation adopts Mypet made by Kao (ltd.) used as a weak base detergent.

The "critical strain (%)" refers to minimum strain affected by the chemical product when the molded article is in contact with the chemical product at a fixed strain. In other words, a greater value of "critical strain (%)" represents better chemical resistance.

$$\text{Critical strain } (\%) = \frac{B}{2A^2}\left[1 - \frac{X^2(A^2 - B^2)}{A^4}\right]^{-\frac{3}{2}} \times t \times 100 \qquad (5)$$

A: long axis of clamp (12 cm),
B: short axis of clamp (4 cm),
t: thickness of test piece (0.15 cm),
X: distance [cm] of long-axis direction from end of crack to middle of ellipse.

(14) Black feel

The test pieces (length: 100 mm, width: 50 mm, thickness: 2 mm) were visually inspected, and evaluation was performed via the following criteria.

◯: black,
x: grey.

Production Examples

Production Example 1

Production of Latex (S-1) of Polyorganosiloxane Rubber 2 parts of tetraethoxysilane (TEOS), 2 parts of γ-methyl acryloxypropionic propyl dimethoxy methyl silane (DSMA), and 96 parts of octamethylcyclotetrasiloxane (made by Momentive Performance Materials Japan (ltd.), trade name: TSF404) were mixed to obtain 100 parts of an organosiloxane mixture. An aqueous solution formed by dissolving 1 part of sodium dodecylbenzene sulfonate (DBSNa) in 150 parts of deionized water was added in the above mixture, and a stable preparatory mixed emulsion was obtained by stirring using a homomixer at 10,000 rpm for 5 minutes and then passing the mixture through a homogenizer at a pressure of 20 MPa twice.

Then, after the above emulsion was added in a separable flask having a volume of 5 L and provided with a cooled condenser, the emulsion was heated to a temperature of 80° C., and then a mixture of 0.20 parts of sulfuric acid and 49.8 parts of deionized water was continuously added over 3 minutes. After the state in which the mixture was heated to a temperature of 80° C. was kept for 6 hours to perform a polymerization reaction, the mixture was cooled to room temperature (25° C.), and the obtained reaction solution was kept under room temperature for 6 hours. Then, a 5% aqueous solution of sodium hydroxide was added to neutralize the reaction solution to a pH of 7.0 to obtain a latex (S-1) of polyorganosiloxane rubber. The evaluation results of the latex are shown in Table 1.

Production Example 2

Production of Latex (S-2) of Polyorganosiloxane Rubber 2 part of TEOS, 0.5 parts of DSMA, and 97.5 parts of a cyclic organosiloxane compound (made by Shinetsu Silicone (ltd.), trade name: DMC, cyclic organosiloxane mixture of 3-membered rings to 6-membered rings) were mixed to obtain 100 parts of an organosiloxane mixture. An aqueous solution formed by dissolving 0.68 parts of sodium dodecylbenzene sulfonate (DBSNa) and 0.68 parts of dodecylbenzenesulfonate (DBSH) in 200 parts of deionized water was added in the above mixture, and a stable preparatory mixed emulsion was obtained by stirring using a homomixer at 10,000 rpm for 2 minutes and then passing the mixture through a homogenizer at a pressure of 20 MPa twice.

Then, after the above emulsion was added in a separable flask having a volume of 5 L and provided with a cooled condenser, the emulsion was heated to a temperature of 85° C., and after the temperature was held for 6 hours to perform a polymerization reaction, the emulsion was cooled to room temperature (25° C.), and the reactant obtained at room temperature was left to stand for 12 hours. Then, a 5% aqueous solution of sodium hydroxide was added to neutralize the reaction solution to a pH of 7.0 to obtain a latex (S-2) of polyorganosiloxane rubber. The evaluation results of the latex are shown in Table 1.

Production Example 3

Production of Latex (S-3) of Polyorganosiloxane Rubber 2 parts of TEOS, 0.5 parts of DSMA, and 97.5 parts of TSF404 were mixed to obtain 100 parts of an organic siloxane mixture. An aqueous solution formed by dissolving 1 part of DBSNa in 170 parts of deionized water was added in the above mixture, and a stable preparatory mixed emulsion was obtained by stirring using a homomixer at 10,000 rpm for 5 minutes and then passing the mixture through a homogenizer at a pressure of 20 MPa twice.

Then, after the above emulsion was added in a separable flask having a volume of 5 L and provided with a cooled condenser, the emulsion was heated to a temperature of 80° C., and then a mixture of 0.20 parts of sulfuric acid and 14.7 parts of deionized water was continuously added over 3 minutes. After the state in which the mixture was heated to a temperature of 80° C. was kept for 6 hours to perform a polymerization reaction, the mixture was cooled to room temperature (25° C.), and the obtained reaction solution was kept under room temperature for 6 hours. Then, a 5% aqueous solution of sodium hydroxide was added to neutralize the reaction solution to a pH of 7.0 to obtain a latex (S-3) of polyorganosiloxane rubber. The evaluation results of the latex are shown in Table 1.

Production Example 4

Production of a Powder (J-1) Containing Polytetrafluoroethylene 6.0 parts of dipotassium alkenyl succinate used as the emulsifier and 230 parts of deionized water were added inside a separable flask having a volume of 2 L provided with a stir wing, a condenser, a thermocouple, and a nitrogen inlet. Then, the components were stirred in a stream of nitrogen gas at room temperature for 30 minutes. Moreover, the above dipotassium alkenyl succinate was used by dissolving in a portion of the above deionized water first.

Then, the temperature of the liquid inside the flask was raised to 70° C., and then an aqueous solution formed by dissolving 0.2 parts of potassium persulfate in 3 parts of deionized water was added inside the flask. Then, a mixture containing 50 parts of methyl methacrylate (MMA), 30 parts of styrene (St), 20 parts of n-butyl acrylate (n-BA), and 0.1 parts of n-octyl mercaptan was added dropwise inside the flask over 4 hours to perform free-radical polymerization. After the dropwise addition, stirring was performed for 1 hour while maintaining the temperature of the liquid inside the flask at 70° C. to obtain a latex (p2-1) containing the vinyl polymer (p2). The content of the vinyl polymer (p2) in the latex was 30%.

166.7 parts of the above latex (p2-1) and 83.3 parts of a latex "Fluon AD939E" (made by Asahi Glass (ltd.), concentration of PTFE: 60%, mass-average molecular weight of PTFE: about 15 million, concentration of polyoxy alkylene alkyl ether: 3%) containing the PTFE-based polymer (p1) were added inside a reaction vessel having a stirring apparatus and a volume of 5 L. The components were stirred for 5 minutes to obtain a latex (j-1). The latex contains 50 parts of the PTFE, 2.5 parts of the polyoxy alkylene alkyl ether, and 50 parts of the above vinyl polymer (p2).

Then, 325 parts of an aqueous calcium acetate solution containing 5.0 parts of calcium acetate as the condensation agent was added inside a flask having a volume of 10 L. After the aqueous solution was heated to a temperature of 80° C., the above latex (j-1) was slowly added dropwise in the aqueous solution while stirring such that the polymer was condensated. A slurry was thus obtained. Then, after the temperature of the slurry was raised to 90° C., the slurry was stirred for another 5 minutes. Then, the precipitate obtained by separating from the slurry was filtered, washed with water, and dried to obtain 100 parts of the powder (J-1) containing polytetrafluoroethylene.

Production Example 5

Production of Latex (S-4) of Polyorganosiloxane 2 parts of tetraethoxysilane (TEOS), 0.5 parts of γ-methyl acryloxypropionic dimethoxy methyl silane (DSMA), and 97.5 parts of octamethylcyclotetrasiloxane (made by Japan Momentive Performance Materials Cooperate Corporation, trade name: TSF-404) were mixed to obtain 100 parts of a siloxane-based mixture. 150 parts of deionized water in which 1.0 part of sodium dodecylbenzene sulfonate (DBSNa) was dissolved was added to the siloxane-based mixture, and a stable preparatory mixed organosiloxane emulsion was obtained by stirring using a homomixer at 10,000 rpm for 5 minutes and then passing the mixture through a homogenizer at a pressure of 20 MPa twice.

The above emulsion was added inside a separable flask having a volume of 5 L and provided with a cooled condenser, and a mixture of 0.20 parts of sulfuric acid and 49.8 parts of deionized water was added over 3 minutes. The state in which the aqueous solution was heated to 80° C. was kept for 7 hours, and then the aqueous solution was cooled to room temperature (25° C.). Then, after the reactant was kept at room temperature for 6 hours, a 10% aqueous solution of sodium hydroxide was used to neutralize the reactant to a pH of 7.0 to obtain a latex (S-4) of polyorganosiloxane. The evaluation results of the latex are shown in Table 1.

Production Example 6

Production of Latex (S-5) of Polyorganosiloxane 2 parts of TEOS, 0.5 parts of DSMA, and 97.5 parts of a cyclic organosiloxane mixture (made by Shin-Etsu Chemical (ltd.), trade name: DMC) were mixed to obtain 100 parts of an organosiloxane mixture. 300 parts of deionized water in which 0.68 parts of DBSNa was dissolved was added to the organosiloxane mixture, and a stable preparatory mixed emulsion was obtained by stirring using a homomixer at 10,000 rpm for 2 minutes and then passing the mixture through a homogenizer at a pressure of 20 MPa twice.

Moreover, 10 parts of dodecylbenzenesulfonate (DBSH) and 90 parts of deionized water were injected in a separable flask provided with a cooled condenser and having a volume of 5 L to prepare an aqueous solution.

The above preparatory mixed emulsion was added dropwise in the aqueous solution heated to 90° C. over 4 hours. After the dropwise addition was complete, the temperature was maintained for 2 hours, and then lowered to room temperature (25° C.). Then, after the reactant was kept at room temperature for 12 hours, a 10% aqueous solution of sodium hydroxide was used to neutralize the reactant to a pH of 7.0 to obtain a latex (S-5) of polyorganosiloxane. The evaluation results of the latex are shown in Table 1.

Example 1

In polymer equivalents, 79.7 parts of the latex (S-1) of the polyorganosiloxane rubber obtained in production example 1 was placed inside a separable flask having a volume of 5 L, and 46 parts of deionized water was added to perform mixing. Then, a mixture of 10.0 parts of n-butyl acrylate (n-BA), 0.3 parts of allyl methacrylate (AMA), and 0.04 parts of cumene hydroperoxide (CHP) was added in the separable flask.

Nitrogen gas substitution was performed on the atmosphere inside the separable flask by streaming nitrogen gas through the flask, and then the liquid temperature was increased to 50° C. An aqueous solution formed by dissolving 0.001 parts of ferrous sulfate (Fe), 0.003 parts of ethylenediaminetetraacetic acid disodium salt (EDTA), and 0.18 parts of rongalite (SFS) in 4.2 parts of deionized water was added at the time point at which the liquid temperature was 50° C. to begin free-radical polymerization. To complete the polymerization of the acrylate component, the state of a liquid temperature of 70° C. was kept for 1 hour to obtain the latex of the composite rubber of polyorganosiloxane and poly(n-butyl acrylate).

In a state in which the temperature of the latex of the above composite rubber was kept at 70° C., a mixed solution of 9.5 parts of MMA, 0.5 parts of n-BA, and 0.03 parts of tert-butyl hydroperoxide (t-BH) was added dropwise in the latex over 1.0 hour to perform polymerization. After the dropwise addition was complete, the liquid temperature was lowered to 25° C. after being kept at 70° C. for 1 hour to obtain the latex of a graft copolymer (G-1) containing polyorganosiloxane. The volume-average particle size of the graft copolymer (G-1) is shown in Table 2.

Then, 500 parts of an aqueous solution for which the concentration of calcium acetate was 1 mass % was kept at a temperature of 40 t, and 300 parts of the latex of the graft copolymer (G-1) was slowly added dropwise therein while stirring to perform solidification. Filtering and dehydration were performed on the obtained graft copolymer. Then, after water 10 times the amount of 100 parts of the graft copolymer was added, washing was performed inside a flask provided with a stirrer for 10 minutes, and then filtering and dehydration were performed. After the operation was repeated twice, drying was performed to obtain the powder of the graft copolymer (G-1). The grafting rate and the volume-average particle size of the graft copolymer (G-1) are shown in Table 2.

Example 2 to Example 3, Comparative Example 1 to Comparative Example 3, and Comparative Example 5

Other than changing the type and the amount of each of the raw materials used in example 1 to the conditions shown in Table 2, the graft copolymers (G-2, G-3, G'-1, G'-2, G'-3, and G'-5) containing polyorganosiloxane were produced via the same method as example 1 to obtain powders thereof. The grafting rate and the volume-average particle size of each of the obtained graft copolymers are shown in Table 2.

Example 4

In polymer equivalents, 90 parts of the latex (S-1) of the polyorganosiloxane rubber obtained in production example 1 was placed inside a separable flask having a volume of 5 L, and 46 parts of deionized water was added to perform mixing. Then, a mixture of 0.5 parts of AMA and 0.07 parts of CHP was added inside the separable flask. Nitrogen gas substitution was performed on the atmosphere inside the separable flask by streaming nitrogen gas through the flask, and then the liquid temperature was increased to 50° C. An aqueous solution formed by dissolving 0.001 parts of ferrous sulfate (Fe), 0.003 parts of EDTA, and 0.18 parts of SFS in 4.2 parts of deionized water was added at the time point at which the liquid temperature was 50° C. to begin free-radical polymerization. To complete the polymerization of the allyl methacrylate component, the state of a liquid temperature of 70° C. was kept for 1 hour. As a result, graft polymerization of the 1st stage was performed. Then, a mixed solution of 9 parts by MMA, 0.5 parts of n-BA, and 0.1 parts of CHP was added dropwise over 1.0 hour to perform polymerization. As a result, graft polymerization of the 2nd stage was performed. Then, after the state in which the liquid temperature was 70° C. was kept for 1 hour, the liquid temperature was lowered to 25° C. to obtain the latex of the graft copolymer (G-4) containing polyorganosiloxane. The grafting rate and the volume-average particle size of the graft copolymer (G-4) are shown in Table 2. Then, the powder of the graft copolymer (G-4) was obtained via the same method as example 1.

Example 5

Other than changing the type and the amount of each of the raw materials used in example 4 to the conditions shown in Table 2, the graft copolymer (G-5) containing polyorganosiloxane was produced via the same method as example 4 to obtain the powder thereof. The grafting rate and the volume-average particle size of the obtained graft copolymer are shown in Table 2.

Comparative Example 4

Other than changing the type and the amount of each of the raw materials used in example 1 to the conditions shown in Table 2, the latex of the composite rubber of polyorganosiloxane and n-butyl acrylate was obtained via the same method as example 1.

In a state in which the temperature of the latex of the above composite rubber was kept at 65° C., a mixed solution of 5.0 parts of AMA and 0.3 parts of CHP was added to perform polymerization. As a result, graft polymerization of the 1st stage was performed. Then, after the liquid temperature was kept at 65° C. for 1 hour, a mixed solution of 15.0 parts of phenyl methacrylate (PhMA) and 0.2 parts of CRP was added dropwise over 10 minutes to perform polymerization. As a result, graft polymerization of the 2nd stage was performed. Then, after the state in which the liquid temperature was 65° C. was kept for 1 hour, the liquid temperature was lowered to 25° C. to obtain the latex of the graft copolymer (G'-4) containing polyorganosiloxane. The grafting rate and the volume-average particle size of the graft copolymer (G'-4) are shown in Table 2.

Then, the powder of the graft copolymer (G'-4) was obtained via the same method as example 1. The grafting rate and the volume-average particle size of the obtained graft copolymer are shown in Table 2.

Example 6 to Example 12, Comparative Example 6 to Comparative Example 15

The powder of the graft copolymer (G-1, G-3, G-4, G-5, G'-1 to G'-5) obtained in example 1, example 3, example 4, example 5, or comparative example 1 to comparative example 5, the organic sulfonic acid metal salt (made by DIC (ltd.), trade name: Megafac F-114), the powder J-1 containing polytetrafluoroethylene obtained in production example 3 used as the anti-dripping agent, the polycarbonate resin (made by Mitsubishi Engineering Plastics (ltd.), trade name: Iupilon S-2000F, viscosity-average molecular weight: 22,000), the phenol-based antioxidant (made by Ciba Japan (ltd.), trade name: Irganox245), the phosphorous-based antioxidant (made by Adeka (ltd.), trade name: Adekastab PEP36) were prepared with the amounts recited in Table 3 or Table 4. Melt mixing was performed on the mixture using a twin-screw extruder (L/D=30) having a cylinder inner diameter of 30 mm at a cylinder temperature of 280° C. and a screw speed of 150 rpm to obtain a polycarbonate-based resin composition. Then, the polycarbonate-based resin composition was formed into particles.

After drying was performed on the obtained particles at 80° C. for 12 hours, the particles were provided to a 100 t injection molding machine (made by Sumitomo Heavy Industries (ltd.), trade name: SE-100DU), and injection molding was performed at a cylinder temperature of 280° C. and a mold temperature of 90° C. to obtain each of the test pieces. Then, the measurement of Charpy impact strength, the measurement of total light transmittance, and the UL-94V test were performed using each of the test pieces to obtain the evaluation results shown in Table 3 or Table 4.

Example 13, Example 14, Comparative Example 16, Comparative Example 17

The powder of the graft copolymer (G-1, G-2, or G'-1) obtained in example 1, example 2, or comparative example 1, the aromatic phosphate-based flame retardant (made by Daihachi Chemical Industry (ltd.), trade name: PX-200), the powder J-2 containing polytetrafluoroethylene (made by Mitsubishi Rayon (ltd.), trade name: Metablen A-3800) used as the anti-dripping agent, and the polycarbonate resin (Iupilon S-2000F) were prepared with the amounts recited in Table 5. Beside the above, the polycarbonate-based resin compositions and each of the test pieces were obtained via the same method as example 6. The evaluation results are shown in Table 5.

[Comparison of Performance of Resin Composition of 1st Invention Group]

It can be known that, in comparison to the resin composition of comparative example 6, the flame retardance, the impact resistance, and the total light transmittance of the resin composition of example 6 having 1.0 part of the graft copolymer (G-1) are superior. Moreover, it can be known that, in comparison to the resin composition of comparative example 7, the flame retardance, the impact resistance, and the total light transmittance of the resin composition of example 7 having 3.1 parts of the graft copolymer (G-1) are superior. It can be known that, in comparison to the resin compositions of comparative example 8 to comparative example 11, the balance among flame retardance, impact resistance, total light transmittance, and appearance of the resin compositions of example 8 to example 11 having 5.3 parts of the graft copolymer (G-1), the graft copolymer (G-3), the graft copolymer (G-4), or the graft copolymer (G-5) is superior. Since the volume-average particle size of the graft copolymer (G'-1) of the resin composition of comparative example 8 is less than 300 nm, the content of the component derived from the silane compound containing a vinyl-based polymerizable group in the polyorganosiloxane (B1) is less than 1 mass %, and therefore the flame retardance, the total light transmittance, and the appearance around the gate are low-grade. Since the content of polyorganosiloxane of the graft copolymer (G'-2) of the resin composition of comparative example 9 is less than 70 mass %, the flame retardance is low-grade. Since the grafting rate of the graft copolymer (G'-3) of the resin composition of comparative example 10 is greater than 10 mass %, the usage amount of the polyfunctional vinyl monomer is 0 mass %, and the graft copolymer (G'-3) does not contain the polyalkyl acrylate (B2), the flame retardance, the low-temperature impact resistance, and the appearance around the gate are low-grade. Since the content of the component derived from the silane compound containing a vinyl-based polymerizable group in the polyorganosiloxane (B1) of the graft copolymer (G'-5) of the resin composition of comparative example 11 is less than 1 mass %, the flame retardance, the low-temperature impact resistance, the total light transmittance, and the appearance around the gate are low-grade. Since the resin composition of comparative example 12 does not contain a graft copolymer, the impact resistance is low-grade.

It can be known that, in comparison to the resin compositions of comparative example 13 to comparative example 15, the balance among flame retardance, impact resistance, total light transmittance, slidability, and chemical resistance of the resin composition of example 12 having 10.0 parts of the graft copolymer (G-1) is superior. Since the content of polyorganosiloxane in the graft copolymer (G'-2) of the resin composition of comparative example 13 is less than 70 mass %, the flame retardance and the slidability are low-grade. Since the acetone soluble matter of the graft copolymer (G'-4) of the resin composition of comparative example 14 is less than 5 mass %, and the grafting rate thereof is greater than 10 mass %, the flame retardance, the slidability, and the chemical resistance are low-grade. Since the resin composition of comparative example 15 does not contain a graft copolymer, the low-temperature impact resistance, the slidability, and the chemical resistance are low-grade.

It can be known that, even in the case that a phosphorous-based flame retardant is used, in comparison to the resin composition of comparative example 16, the flame retardance and the low-temperature impact resistance of the resin compositions of example 13 and example 14 are also superior. Since the volume-average particle size of the graft copolymer (G'-1) of the resin composition of comparative example 16 is less than 300 nm, the content of the component derived from the silane compound containing a vinyl-based polymerizable group in the polyorganosiloxane (B1) is less than 1 mass %, and therefore the flame retardance and the low-temperature impact resistance are low-grade. Moreover, since the resin composition of comparative example 17 does not contain a graft copolymer, the flame retardance and the low-temperature impact resistance are low-grade.

The following are examples of the 2nd invention group.

Example 21

272.1 parts of the latex (S-4) of polyorganosiloxane (80 parts of polyorganosiloxane) obtained in production example 5 was added inside a separable flask provided with a condenser tube, a nitrogen inlet tube, a thermometer, and a stirring apparatus and having a volume of 5 L. Then, after 50 parts of deionized water was added to perform mixing, a mixture of 10.0 parts of n-butyl acrylate (n-BA), 0.18 parts of allyl methacrylate (AMA), and 0.04 parts of cumene hydroperoxide (CHP) was added.

Nitrogen gas substitution was performed on the atmosphere inside the separable flask by streaming nitrogen gas through the flask, and then the temperature was increased to 60° C. The liquid temperature was changed to 60° C., and an aqueous solution containing 0.001 parts of ferrous sulfate (Fe), 0.003 parts of ethylenediaminetetraacetic acid (EDTA), 0.3 parts of rongalite (SFS), and 2.5 parts of deionized water was added. Then, the state in which the liquid temperature was 70° C. was kept for 1 hour to obtain the latex of a composite rubber.

In the state in which the temperature of the latex of the above composite rubber was kept at 70° C., a mixture of 9.5 parts of methyl methacrylate (MMA), 0.5 parts of n-butyl acrylate (n-BA), and 0.05 parts of t-butyl hydroperoxide (t-BH) was added dropwise over 60 minutes to perform polymerization.

After the dropwise addition was complete and after the state of a liquid temperature of 70° C. was kept for 1 hour, the liquid temperature was lowered to 25° C. to obtain the latex of the graft copolymer (G-21). The measurement results of the mass-average particle size Dw and the particle size distribution Dw/Dn of the graft copolymer in the latex are shown in Table 6.

Then, 500 parts of an aqueous solution having a calcium chloride concentration of 5.0 mass % was heated to a temperature of 60° C. and stirring was performed. 340 parts of the above latex was slowly added dropwise therein and the mixture was solidified. Filtering and dehydration were performed on the obtained graft copolymer. Then, after water 10 times the amount of 100 parts of the graft copolymer was added, washing was performed inside a flask provided with a stirrer for 10 minutes, and then filtering and dehydration were performed. After the operation was repeated twice, drying was performed to obtain the powder of the graft copolymer (G-21). The powder of the graft copolymer (G-21) can be used as the slidability-improving agent.

Example 22

3 parts of the graft copolymer (G-21) obtained in example 21, 97 parts of a PC resin (made by Mitsubishi Engineering Plastics (ltd.), lupilon S-2000F), and carbon black (made by Mitsubishi Chemical (ltd.), #960B) were manually mixed. After melt mixing was performed on the obtained resin composition using a 30 mmφ twin-screw extruder (L/D=30) at a cylinder temperature of 280° C. and a screw speed of 150 rpm, the resin composition was formed into particles.

After drying was performed on the obtained particles at 80° C. for 12 hours, the particles were provided to a 100 t injection molding machine (made by Sumitomo Heavy Industries (ltd.), trade name: SE-100DU), and injection molding was performed at a cylinder temperature of 280° C. and a mold temperature of 80° C. A family mold was used according to JIS K7152 to obtain each of the test pieces for evaluation of Charpy impact strength (length: 80.0 mm, width: 10.0 mm, thickness: 4 mm, provided with V notch), slidability, and color rendering (longitude: 100 mm, traverse: 50 mm, thickness: 2 mm). Each of the evaluation results using the particles and each of the test pieces are shown in Table 7.

Example 23 and Example 24

Other than changing the usage amounts of the graft copolymer (G-21) and the PC resin, the thermoplastic resin compositions, the particles, and the test pieces were obtained via the same method as example 22. Each of the evaluation results is shown in Table 7.

Example 25

Other than changing to the composition shown in Table 6, polymerization was performed via the same method as example 21 to obtain the graft copolymer (G-25). The evaluation results of the graft copolymer are shown in Table 6.

Example 26 to Example 29

Other than setting the usage amounts of the graft copolymer (G-25) and the PC resin to the values shown in Table 7, the thermoplastic resin compositions, the particles, and the test pieces were obtained via the same method as example 21. Each of the evaluation results is shown in Table 7.

Comparative Example 21

Other than setting the raw materials of the graft polymerization to the compositions shown in Table 6, graft polymerization was performed via the same method as example 21 to obtain the graft copolymer (G'-21). The evaluation results of the graft copolymer are shown in Table 6.

Comparative Example 22 and Comparative Example 23

Other than setting the usage amounts of the graft copolymer (G'-21) and the PC resin to the values shown in Table 7, the thermoplastic resin compositions, the particles, and the test pieces were obtained via the same method as example 21. Each of the evaluation results is shown in Table 7.

Comparative Example 24

Other than setting the raw materials of the graft polymerization to the compositions shown in Table 6, polymerization was performed in the same manner as example 21 to obtain the graft copolymer (G'-24). The evaluation results of the graft copolymer are shown in Table 6.

Comparative Example 25 to Comparative Example 27

Other than setting the usage amounts of the graft copolymer (G'-24) and the PC resin to the values shown in Table 7, the thermoplastic resin compositions, the particles, and the test pieces were obtained via the same method as example 21. Each of the evaluation results is shown in Table 7.

[Comparison of Performance of Resin Composition of 2nd Invention Group]

As clearly shown in example 22 to example 24 and example 26 to example 29, the slidability of the thermoplastic resin composition using the slidability-improving agent of the invention is excellent. Therefore, the results of the color rendering, the Charpy impact strength, and the molding appearance are also good.

Moreover, since the content of polyorganosiloxane in the slidability-improving agent used in the thermoplastic resin compositions of comparative example 22 and comparative example 23 is small, the slidability and the Charpy impact strength at low temperature are low. Since the mass-average particle size of the slidability-improving agent used in the thermoplastic resin compositions of comparative example 25 and comparative example 26 is small, the color rendering is low-grade. Therefore, flow marks readily occur near the gate during molding, and molding appearance is poor. Since the thermoplastic resin of comparative example 27 does not use a slidability-improving agent, the slidability is low-grade, and therefore the Charpy impact strength at low temperature is also very poor.

TABLE 1

|  | Production example 1 | Production example 2 | Production example 3 | Production example 5 | Production example 6 |
|---|---|---|---|---|---|
| Latex of polyorganosiloxane | S-1 | S-2 | S-3 | S-4 | S-5 |
| Solid content (%) | 29.8 | 28.3 | 29 | 28.5 | 19.5 |
| Mass-average particle size (nm) | 403 | 254 | 390 | 354 | 70 |
| Dw/Dn (—) | 1.05 | 2.95 | 1.04 | 1.12 | 1.11 |
| Content of component derived from silane compound containing vinyl-based polymerizable group in polyorganosiloxane (%) | 2 | 0.5 | 0.5 | 0.5 | 0.5 |

TABLE 2

|  |  |  | Example 1 | Example 2 | Example 3 | Example 4 | Example 5 | Comparative example 1 |
|---|---|---|---|---|---|---|---|---|
| Graft copolymer |  |  | G-1 | G-2 | G-3 | G-4 | G-5 | G'-1 |
| Latex of polyorganosiloxane (solid content) | S-1 | parts | 79.7 | 80 | 75 | 90 | 80 | — |
|  | S-2 | parts | — | — | — | — | — | 80 |
|  | S-3 | parts | — | — | — | — | — | — |
| Monomer for composite rubber | n-BA | parts | 10 | 8.8 | 9.5 | — | — | 8.8 |
|  | AMA | parts | 0.3 | 0.2 | 0.5 | — | — | 0.2 |
|  | CHP | parts | 0.04 | — | 0.15 | — | — | — |
|  | t-BH | parts | — | 0.03 | — | — | — | — |
|  | CB | parts | — | — | — | — | — | 0.16 |
| Reducing agent . . . etc. | Fe | parts | 0.001 | 0.001 | 0.0003 | 0.001 | 0.001 | 0.001 |
|  | EDTA | parts | 0.003 | 0.003 | 0.0009 | 0.003 | 0.003 | 0.003 |
|  | SFS | parts | 0.18 | 0.18 | 0.18 | 0.18 | 0.18 | 0.24 |

TABLE 2-continued

|  |  |  |  |  |  |  |  |  |  |
|---|---|---|---|---|---|---|---|---|---|
| Vinyl monomer for graft polymerization | 1st stage | AMA | parts | — | — | — | 0.5 | 0.5 | — |
|  |  | MMA | parts | 9.5 | 5.2 | 13 | — | — | 11 |
|  |  | St | parts | — | 5.5 | — | — | — | — |
|  |  | PhMA | parts | — | — | — | — | — | — |
|  |  | BA | parts | 0.5 | 0.3 | 2 | — | — | — |
|  |  | CHP | parts | — | — | 0.08 | 0.07 | 0.07 | — |
|  |  | t-BH | parts | 0.03 | 0.07 | — | — | — | — |
|  |  | CB | parts | — | — | — | — | — | 0.24 |
|  | 2nd stage | PhMA | parts | — | — | — | — | — | — |
|  |  | MMA | parts | — | — | — | 9 | 19 | — |
|  |  | BA | parts | — | — | — | 0.5 | 0.5 | — |
|  |  | CHP | parts | — | — | — | 0.1 | 0.2 | — |
| Volume-average particle size |  |  | nm | 430 | 455 | 457 | 423 | 435 | 260 |
| Acetone soluble matter |  |  | % | 9.1 | 12.7 | 7.9 | 10.3 | 12.3 | 18.4 |
| Grafting rate |  |  | % | 1 | −3 | 8.4 | −0.8 | 8.9 | −9.3 |
| (B1)/(B2) |  |  |  | 79.7/10.3 | 80/9.0 | 75/10.0 | 90/0 | 80/0 | 80/9.0 |

|  |  |  |  | Comparative example 2 | Comparative example 3 | Comparative example 4 | Comparative example 5 |
|---|---|---|---|---|---|---|---|
| Graft copolymer |  |  |  | G'-2 | G'-3 | G'-4 | G'-5 |
| Latex of polyorganosiloxane (solid content) | S-1 |  | parts | 53.4 | 80 | 70 | — |
|  | S-2 |  | parts | — | — | — | — |
|  | S-3 |  | parts | — | — | — | 75 |
| Monomer for composite rubber | n-BA |  | parts | 35.6 | — | 9 | 9.5 |
|  | AMA |  | parts | 1.1 | — | 1 | 0.5 |
|  | CHP |  | parts | 0.14 | — | 0.3 | 0.15 |
|  | t-BH |  | parts | — | — | — | — |
|  | CB |  | parts | — | — | — | — |
| Reducing agent . . . etc. | Fe |  | parts | 0.001 | 0.001 | 0.001 | 0.0003 |
|  | EDTA |  | parts | 0.003 | 0.003 | 0.003 | 0.0009 |
|  | SFS |  | parts | 0.3 | 0.24 | 0.24 | 0.18 |
| Vinyl monomer for graft polymerization | 1st stage | AMA | parts | — | — | 5 | — |
|  |  | MMA | parts | 9.4 | — | — | 13 |
|  |  | St | parts | — | — | — | — |
|  |  | PhMA | parts | — | 20 | — | — |
|  |  | BA | parts | 0.5 | — | — | 2 |
|  |  | CHP | parts | — | 0.2 | 0.3 | 0.08 |
|  |  | t-BH | parts | 0.03 | — | — | — |
|  |  | CB | parts | — | — | — | — |
|  | 2nd stage | PhMA | parts | — | — | 15 | — |
|  |  | MMA | parts | — | — | — | — |
|  |  | BA | parts | — | — | — | — |
|  |  | CHP | parts | — | — | 0.2 | — |
| Volume-average particle size |  |  | nm | 432 | 454 | 461 | 413 |
| Acetone soluble matter |  |  | % | 4.7 | 9.9 | 4.5 | 10.4 |
| Grafting rate |  |  | % | 5.9 | 12.6 | 19.3 | 5.4 |
| (B1)/(B2) |  |  |  | 53.4/36.7 | 80/0 | 70/10.0 | 75/10.0 | n-BA: n-butyl acrylate
AMA: allyl methacrylate
MMA: methyl methacrylate
St: styrene
CHP: cumene hydroperoxide
t-BH: tert-butyl hydroperoxide
CB: diisopropylbenzene hydroperoxide
PhMA: phenyl methacrylate
Fe: ferrous sulfate
EDTA: ethylenediaminetetraacetic acid disodium salt
SFS: rongalite

TABLE 3

|  |  |  | Example 6 | Comparative example 6 | Example 7 | Comparative example 7 | Example 8 | Comparative example 8 | Comparative example 9 |
|---|---|---|---|---|---|---|---|---|---|
| PC resin (A) | S-2000F | parts | 100 | 100 | 100 | 100 | 100 | 100 | 100 |
| Graft copolymer | type |  | G-1 | G'-1 | G-1 | G'-1 | G-1 | G'-1 | G'-2 |
|  | parts |  | 1 | 1 | 3.1 | 3.1 | 5.3 | 5.3 | 5.3 |
| Fluorine-based resin (C) | J-1 | parts | 1 | 1 | 1 | 1 | 1.1 | 1.1 | 1.1 |
| Flame retardant (D) | F-114 | parts | 0.05 | 0.05 | 0.05 | 0.05 | 0.05 | 0.05 | 0.05 |
| Antioxidant (E) | Irg245 | parts | 0.1 | 0.1 | 0.1 | 0.1 | 0.1 | 0.1 | 0.1 |
|  | PEP36 | parts | 0.1 | 0.1 | 0.1 | 0.1 | 0.1 | 0.1 | 0.1 |
| Flame retardance | Total burn time | seconds | 20 | 50 | 13 | 65 | 21 | 351 | 46 |

TABLE 3-continued

|  |  |  |  |  |  |  |  |  |  |
|---|---|---|---|---|---|---|---|---|---|
|  | Longest burn time of one test piece | seconds |  | 7 | 12 | 9 | 14 | 7 | 96 | 14 |
|  | Result | — |  | V0 | V1 | V0 | V1 | V0 | Failure | V1 |
| Impact resistance | 23° C. | kJ/m² |  | 67.7 | 67 | 64.7 | 67.2 | 60.4 | 57.9 | 63.4 |
|  | −30° C. | kJ/m² |  | 15.1 | 9.7 | 21.5 | 13.7 | 47.2 | 44.4 | 44 |
|  | Total light transmittance | % |  | 39 | 35 | 22 | 20 | 15 | 11 | 20 |
| Appearance near gate | Visual evaluation | — |  | + | + | + | + | + | −− | + |
|  | Ra | μm |  | 0.01 | 0.01 | 0.01 | 0.01 | 0.02 | 0.11 | 0.02 |
| Appearance of center portion | Ra | μm |  | 0.01 | 0.02 | 0.01 | 0.01 | 0.01 | 0.03 | 0.01 |

|  |  |  | Comparative example 10 | Example 9 | Comparative example 11 | Example 10 | Example 11 | Comparative example 12 |
|---|---|---|---|---|---|---|---|---|
| PC resin (A) | S-2000F | parts | 100 | 100 | 100 | 100 | 100 | 100 |
| Graft copolymer | type |  | G'-3 | G-3 | G'-5 | G-4 | G-5 | — |
|  | parts |  | 5.3 | 5.3 | 5.3 | 5.3 | 5.3 | — |
| Fluorine-based resin (C) | J-1 | parts | 1.1 | 1.1 | 1.1 | 1.1 | 1.1 | 1 |
| Flame retardant (D) | F-114 | parts | 0.05 | 0.05 | 0.05 | 0.05 | 0.05 | 0.05 |
| Antioxidant (E) | Irg245 | parts | 0.1 | 0.1 | 0.1 | 0.1 | 0.1 | 0.1 |
|  | PEP36 | parts | 0.1 | 0.1 | 0.1 | 0.1 | 0.1 | 0.1 |
| Flame retardance | Total burn time | seconds | 148 | 39 | 64 | 35 | 45 | 16 |
|  | Longest burn time of one test piece | seconds | 41 | 9 | 18 | 9 | 9 | 9 |
|  | Result | — | Failure | V0 | V1 | V0 | V0 | V0 |
| Impact resistance | 23° C. | kJ/m² | 66.5 | 65.5 | 71.2 | 69 | 69 | 21 |
|  | −30° C. | kJ/m² | 18.1 | 44.3 | 27.6 | 46.3 | 44.8 | 13 |
|  | Total light transmittance | % | 24 | 18 | 13 | 16 | 17 | 63 |
| Appearance near gate | Visual evaluation | — | − | + | −− | + | + | ++ |
|  | Ra | μm | 0.13 | 0.02 | 0.15 | 0.02 | 0.02 | 0.01 |
| Appearance of center portion | Ra | μm | 0.04 | 0.01 | 0.02 | 0.01 | 0.01 | 0.01 |

TABLE 4

|  |  |  | Example 12 | Comparative example 13 | Comparative example 14 | Comparative example 15 |
|---|---|---|---|---|---|---|
| PC resin (A) | S-2000F | parts |  | 100 | 100 | 100 |
| Graft copolymer | type |  | G-1 | G'-2 | G'-4 | — |
|  | parts |  | 10 | 10 | 10 | — |
| Fluorine-based resin (C) | J-1 | parts | 0.9 | 0.9 | 0.9 | 0.9 |
| Flame retardant (D) | F-114 | parts | 0.1 | 0.1 | 0.1 | 0.1 |
| Antioxidant (E) | Irg245 | parts | 0.1 | 0.1 | 0.1 | 0.1 |
|  | PEP36 | parts | 0.1 | 0.1 | 0.1 | 0.1 |
| Flame retardance | Total burn time | seconds | 45 | 110 | 114 | 8 |
|  | Longest burn time of one test piece | seconds | 9 | 37 | 39 | 2 |
|  | Result | — | V0 | Failure | Failure | V0 |
| Impact resistance | 23° C. | kJ/m² | 57.7 | 55.8 | 54.3 | 78.4 |
|  | −30° C. | kJ/m² | 48.3 | 45.4 | 41.6 | 15 |
|  | Total light transmittance | % | 12 | 12 | 13 | 66 |
| Slidability | Friction | N | 3.4 | 4.4 | 4.2 | 16.4 |
|  | Dynamic friction coefficient | — | 0.11 | 0.15 | 0.14 | 0.55 |
| Chemical resistance (critical strain) |  | % | 0.96 | 0.92 | 0.77 | 0.67 |

TABLE 5

|  |  |  | Example 13 | Comparative example 16 | Example 14 | Comparative example 17 |
|---|---|---|---|---|---|---|
| PC resin (A) | S-2000F | parts | 100 | 100 | 100 | 100 |
| Graft copolymer | type |  | G-1 | G'-1 | G-2 | — |
|  | parts |  | 5.6 | 5.6 | 5.6 | — |

TABLE 5-continued

|  |  |  | Example 13 | Comparative example 16 | Example 14 | Comparative example 17 |
|---|---|---|---|---|---|---|
| Fluorine-based resin (C) | J-2 | parts | 0.6 | 0.6 | 0.6 | 0.6 |
| Flame retardant (D) | PX-200 | parts | 5.6 | 5.6 | 5.6 | 5.6 |
| Flame retardance | Total burn time | seconds | 6 | 21 | 19 | 110 |
|  | Longest burn time of one test piece | seconds | 1 | 10 | 6 | 22 |
|  | Result | — | V0 | V1 | V0 | V2 |
| Impact resistance | 23° C. | kJ/m$^2$ | 58.6 | 57.5 | 59.6 | 14.6 |
|  | −30° C. | kJ/m$^2$ | 30.1 | 18.9 | 29.6 | 8 |

TABLE 6

|  |  | Example 21 | Example 25 | Comparative example 21 | Comparative example 24 |
|---|---|---|---|---|---|
| Graft copolymer |  | G-21 | G-25 | G'-21 | G'-24 |
| Latex of polyorganosiloxane (solid content) (mass %) | S-4 | 80 | 54 | 30 | — |
|  | S-5 | — | — | — | 80 |
| Monomer for composite rubber (mass %) | n-BA | 10 | 36 | 60 | 10 |
|  | AMA | 0.18 | 0.18 | 0.18 | 0.18 |
| Vinyl monomer for graft polymerization (mass %) | MMA | 9.5 | 9.5 | 9.5 | 9.5 |
|  | BA | 0.5 | 0.5 | 0.5 | 0.5 |
| Mass-average particle size (nm) |  | 480 | 524 | 581 | 167 |
| Dw/Dn (—) |  | 1.15 | 1.17 | 1.22 | 1.23 |

INDUSTRIAL APPLICABILITY

The flame retardance, the impact resistance, the color rendering, the slidability, and the chemical resistance of the resin composition obtained by adding the graft copolymer $(G_F)$ of the 1st invention group in a thermoplastic resin (in particular polycarbonate resin) are excellent. The resin composition can be applied in, for instance, materials in the automotive sector, the OA machine sector such as a printer, or the electrical and electronics sector such as a mobile phone.

The balance among slidability, color rendering (pigment colorability), and impact strength of the resin composition obtained by adding the slidability-improving agent containing the powder of the graft copolymer $(G_S)$ of the 2nd invention group in a thermoplastic resin is excellent, and the molding appearance is also good. The molded article obtained from the resin composition can be widely applied in various objects such as automobiles, building materials,

TABLE 7

|  |  |  | Example 22 | Example 23 | Example 24 | Example 26 | Example 27 | Example 28 |
|---|---|---|---|---|---|---|---|---|
| Thermoplastic resin (K) | PC resin | parts | 97 | 95 | 92 | 97 | 95 | 92 |
| Graft copolymer | G-21 | parts | 3 | 5 | 8 | — | — | — |
|  | G-25 | parts | — | — | — | 3 | 5 | 8 |
|  | G'-21 | parts | — | — | — | — | — | — |
|  | G'-24 | parts | — | — | — | — | — | — |
| Filler | CB | parts | 0.1 | 0.1 | 0.1 | 0.1 | 0.1 | 0.1 |
| Impact resistance | 23° C. | kJ/m$^2$ | 66 | 62 | 54 | 60 | 61 | 52 |
|  | −30° C. | kJ/m$^2$ | 38 | 48 | 52 | 28 | 39 | 44 |
| Slidability | Dynamic friction coefficient | — | 0.558 | 0.147 | 0.117 | 0.583 | 0.15 | 0.123 |
| Color rendering | L* | — | 16.5 | 23.7 | 29.4 | 10.4 | 18.3 | 22.6 |
|  | Black feel | — | ○ | ○ | ○ | ○ | ○ | ○ |
|  | Flow mark of gate portion | — | ++ | +− | ++ | ++ | ++ | ++ |

|  |  |  | Example 29 | Comparative example 22 | Comparative example 23 | Comparative example 25 | Comparative example 26 | Comparative example 27 |
|---|---|---|---|---|---|---|---|---|
| Thermoplastic resin (K) | PC resin | parts | 88 | 95 | 92 | 95 | 92 | 100 |
| Graft copolymer | G-21 | parts | — | — | — | — | — | — |
|  | G-25 | parts | 12 | — | — | — | — | — |
|  | G'-21 | parts | — | 5 | 8 | — | — | — |
|  | G'-24 | parts | — | — | — | 5 | 8 | — |
| Filler | CB | parts | 0.1 | 0.1 | 0.1 | 0.1 | 0.1 | 0.1 |
| Impact resistance | 23° C. | kJ/m$^2$ | 50 | 60 | 52 | 59 | 51 | 67 |
|  | −30° C. | kJ/m$^2$ | 43 | 35 | 37 | 40 | 43 | 17 |
| Slidability | Dynamic friction coefficient | — | 0.108 | 0.433 | 0.21 | 0.157 | 0.117 | 0.7 |
| Color rendering | L* | — | 29.1 | 16.8 | 20.6 | 27.5 | 38.5 | 2 |
|  | Black feel | — | ○ | ○ | ○ | X | X | ○ |
|  | Flow mark of gate portion | — | + | ++ | ++ | − | − | ++ | toys, and office supplies, and can be further widely applied in various fields lead by OA machines and home appliances, and in particular can be used as a sliding member.

The invention claimed is:

1. A graft copolymer comprising rubber formed by performing graft polymerization of 1 or more vinyl monomers on a rubber containing a polyorganosiloxane (B1), wherein a content of a component derived from a silane compound containing a vinyl-based polymerizable group in the polyorganosiloxane (B1) is 1 mass % to 10 mass %, a volume-average particle size of the graft copolymer containing rubber is 300 nm to 2000 nm, a content of the polyorganosiloxane (B1) in the graft copolymer containing rubber is 70 mass % to 85 mass %, a content of a component derived from the 1 or more vinyl monomers in the graft copolymer containing rubber is 0.1 mass % to 1.5 mass % and a grafting rate obtained from the following formula (1) is 10 mass % or less, $$\text{Grafting rate} = \frac{(wa - wo \times R/100)}{(wo \times R/100)} \times 100 \quad (1)$$

wa: mass (g) of acetone insoluble matter of sample, wo: total amount (g) of sample, R: fraction (mass %) of the rubber containing the polyorganosiloxane (B1) in a raw material added in a production of the graft copolymer.

2. The graft copolymer containing rubber of claim 1, wherein the rubber containing a polyorganosiloxane (B1) is a composite rubber containing a polyorganosiloxane (B1) and a polyalkyl (meth)acrylate (B2) and an acetone soluble matter in the graft copolymer containing rubber is 5.0 mass % to 30.0 mass %.

3. The graft copolymer containing rubber of claim 2, wherein a ratio B1/B2 of the polyorganosiloxane (B1) and the polyalkyl (meth) acrylate (B2) is 74/26 to 99/1 mass %.

4. The graft copolymer containing rubber of claim 1, wherein the volume-average particle size is 400 nm to 1000 nm.

* * * * *